(12) United States Patent
Kodavalla et al.

(10) Patent No.: US 8,184,904 B2
(45) Date of Patent: May 22, 2012

(54) METHOD AND APPARATUS FOR DYNAMIC AND ADAPTIVE ENHANCEMENT OF COLORS IN DIGITAL VIDEO IMAGES

(75) Inventors: Vijay Kumar Kodavalla, Bangalore (IN); Deepak Kumar Aravapalli, Tenali (IN)

(73) Assignee: Wipro Limited, Bangalore, Karnataka (IN)

(*) Notice: Subject to any disclaimer, the term of this patent is extended or adjusted under 35 U.S.C. 154(b) by 1014 days.

(21) Appl. No.: 12/132,615

(22) Filed: Jun. 4, 2008

(65) Prior Publication Data

US 2009/0304275 A1  Dec. 10, 2009

(51) Int. Cl.
*G06K 9/00* (2006.01)
(52) U.S. Cl. .................................. 382/167; 358/520
(58) Field of Classification Search ............ 382/12–167; 358/318–340
See application file for complete search history.

(56) References Cited

U.S. PATENT DOCUMENTS

| | | | | |
|---|---|---|---|---|
| 7,508,550 B2* | 3/2009 | Kameyama | .................. | 358/3.23 |
| 2003/0142879 A1* | 7/2003 | Kim | .............................. | 382/274 |
| 2005/0270427 A1* | 12/2005 | Kim et al. | ...................... | 348/652 |
| 2006/0188153 A1* | 8/2006 | Kempf et al. | .................. | 382/167 |
| 2008/0018797 A1* | 1/2008 | Hsieh et al. | ..................... | 348/645 |
| 2008/0049275 A1* | 2/2008 | Hsu et al. | ....................... | 358/520 |
| 2008/0068510 A1* | 3/2008 | Kanai | ............................ | 348/672 |
| 2009/0022395 A1* | 1/2009 | Cho et al. | ...................... | 382/167 |

* cited by examiner

*Primary Examiner* — Jingge Wu
(74) *Attorney, Agent, or Firm* — Prakash Nama; Global IP Services, PLLC

(57) ABSTRACT

A method and apparatus for dynamically, adaptively and/or concurrently enhancing and diminishing of colors in digital video images is disclosed. In one embodiment, a method includes dynamically computing a saturation gain, adaptive to slow or fast moving image sequences, for each user chosen color of a substantially current video frame, dynamically computing a saturation dependent value gains, adaptive to slow or fast moving image sequences, for each user chosen color of the substantially current video frame, determining which of the dynamically computed saturation gain and a saturation dependent value gains associated with each user chosen color or no gain is to be applied on a per-pixel basis by comparing Hue, saturation and value (HSV) components of each pixel with predefined HSV ranges of various user chosen colors, respectively, and applying the determined saturation and/or saturation dependent value gain on the per-pixel basis, in the substantially current or next video frame.

10 Claims, 16 Drawing Sheets

| EXAMPLE USER CHOSEN COLOR | HUE COMPONENT (FULL SCALE RANGE 0° to 360°) | | SATURATION COMPONENT (FULL SCALE RANGE 0 to 1) | | VALUE COMPONENT (FULL SCALE RANGE 0 to 1) | |
|---|---|---|---|---|---|---|
| | MINIMUM | MAXIMUM | MINIMUM | MAXIMUM | MINIMUM | MAXIMUM |
| VEGETATION (GREEN) | 65° | 165° | 0 | 1 | 0 | 1 |
| SKY – SEA (BLUE) | 180° | 275° | 0 | 1 | 0 | 1 |
| SKIN - TONE | 330° | 30° | 0 | 0.6 | 0.16 | 1 |

↖ 200

| BIN NAME | VALUE COMPONENT RANGE | SATURATION COMPONENT RANGE |
|---|---|---|
| B0 | 0 TO (FULL SCALE VALUE RANGE) / 8 | 0 TO (MAX SATURATION − MIN SATURATION) / 3 |
| B1 | (FULL SCALE VALUE RANGE) / 8 TO (FULL SCALE VALUE RANGE) / 4 | 0 TO (MAX SATURATION − MIN SATURATION) / 3 |
| B2 | (FULL SCALE VALUE RANGE) / 4 TO (3*(FULL SCALE VALUE RANGE)) / 8 | 0 TO (MAX SATURATION − MIN SATURATION) / 3 |
| B3 | (3*(FULL SCALE VALUE RANGE)) / 8 TO (FULL SCALE VALUE RANGE) / 2 | 0 TO (MAX SATURATION − MIN SATURATION) / 3 |
| B4 | 0 TO (FULL SCALE VALUE RANGE) / 8 | (MAX SATURATION − MIN SATURATION) / 3 TO (2*(MAX SATURATION − MIN SATURATION)) / 3 |
| B5 | (FULL SCALE VALUE RANGE) / 8 TO (FULL SCALE VALUE RANGE) / 4 | (MAX SATURATION − MIN SATURATION) / 3 TO (2*(MAX SATURATION − MIN SATURATION)) / 3 |
| B6 | (FULL SCALE VALUE RANGE) / 4 TO (3*(FULL SCALE VALUE RANGE)) / 8 | (MAX SATURATION − MIN SATURATION) / 3 TO (2*(MAX SATURATION − MIN SATURATION)) / 3 |
| B7 | (3*(FULL SCALE VALUE RANGE)) / 8 TO (FULL SCALE VALUE RANGE) / 2 | (MAX SATURATION − MIN SATURATION) / 3 TO (2*(MAX SATURATION − MIN SATURATION)) / 3 |
| B8 | 0 TO (FULL SCALE VALUE RANGE) / 8 | (2*(MAX SATURATION − MIN SATURATION)) / 3 TO (MAX SATURATION − MIN SATURATION) |
| B9 | (FULL SCALE VALUE RANGE) / 8 TO (FULL SCALE VALUE RANGE) / 4 | (2*(MAX SATURATION − MIN SATURATION)) / 3 TO (MAX SATURATION − MIN SATURATION) D |
| B10 | (FULL SCALE VALUE RANGE) / 4 TO (3*(FULL SCALE VALUE RANGE)) / 8 | (2*(MAX SATURATION − MIN SATURATION)) / 3 TO (MAX SATURATION − MIN SATURATION) |
| B11 | (3*(FULL SCALE VALUE RANGE)) / 8 TO (FULL SCALE VALUE RANGE) / 2 | (2*(MAX SATURATION − MIN SATURATION)) / 3 TO (MAX SATURATION − MIN SATURATION) |
| B12 | (3*(FULL SCALE VALUE RANGE)) / 4 TO (13*(FULL SCALE VALUE RANGE)) / 16 | 0 TO (MAX SATURATION − MIN SATURATION) / 3 |
| B13 | (13*(FULL SCALE VALUE RANGE)) / 16 TO (14*(FULL SCALE VALUE RANGE)) / 16 | 0 TO (MAX SATURATION − MIN SATURATION) / 3 |
| B14 | (14*(FULL SCALE VALUE RANGE)) / 16 TO (15*(FULL SCALE VALUE RANGE)) / 16 | 0 TO (MAX SATURATION − MIN SATURATION) / 3 |
| B15 | (15*(FULL SCALE VALUE RANGE)) / 16 TO (FULL SCALE VALUE RANGE) | 0 TO (MAX SATURATION − MIN SATURATION) / 3 |
| B16 | (3*(FULL SCALE VALUE RANGE)) / 4 TO (13*(FULL SCALE VALUE RANGE)) / 16 | (MAX SATURATION − MIN SATURATION) / 3 TO (2*(MAX SATURATION − MIN SATURATION)) / 3 |
| B17 | (13*(FULL SCALE VALUE RANGE)) / 16 TO (14*(FULL SCALE VALUE RANGE)) / 16 | (MAX SATURATION − MIN SATURATION) / 3 TO (2*(MAX SATURATION − MIN SATURATION)) / 3 |
| B18 | (14*(FULL SCALE VALUE RANGE)) / 16 TO (15*(FULL SCALE VALUE RANGE)) / 16 | (MAX SATURATION − MIN SATURATION) / 3 TO (2*(MAX SATURATION − MIN SATURATION)) / 3 |
| B19 | (15*(FULL SCALE VALUE RANGE)) / 16 TO (FULL SCALE VALUE RANGE) | (MAX SATURATION − MIN SATURATION) / 3 TO (2*(MAX SATURATION − MIN SATURATION)) / 3 |
| B20 | (3*(FULL SCALE VALUE RANGE)) / 4 TO (13*(FULL SCALE VALUE RANGE)) / 16 | (2*(MAX SATURATION − MIN SATURATION)) / 3 TO (MAX SATURATION − MIN SATURATION) |
| B21 | (13*(FULL SCALE VALUE RANGE)) / 16 TO (14*(FULL SCALE VALUE RANGE)) / 16 | (2*(MAX SATURATION − MIN SATURATION)) / 3 TO (MAX SATURATION − MIN SATURATION) |
| B22 | (14*(FULL SCALE VALUE RANGE)) / 16 TO (15*(FULL SCALE VALUE RANGE)) / 16 | (2*(MAX SATURATION − MIN SATURATION)) / 3 TO (MAX SATURATION − MIN SATURATION) |
| B23 | (15*(FULL SCALE VALUE RANGE)) / 16 TO (FULL SCALE VALUE RANGE) | (2*(MAX SATURATION − MIN SATURATION)) / 3 TO (MAX SATURATION − MIN SATURATION) |

| LOT NUMBER | VALUE-SATURATION 2D-HISTOGRAM BIN NUMBER | SATURATION RANGE | VALUE RANGE | NEW DARK-GAIN/ NEW BRIGHT-GAIN (NEW_K_DARK/ NEW_K_BRIGHT) | |
|---|---|---|---|---|---|
| DL0 | 0 | 0-Th1 | 0.0 – 0.125 | 7 | NEW_K_DARK |
| | 1 | 0-Th1 | 0.125 – 60.25 | 6 | |
| | 2 | 0-Th1 | 0.25 – 0.375 | 5 | |
| | 3 | 0-Th1 | 0.375 – 0.5 | 4 | |
| DL1 | 4 | Th1-Th2 | 0.0 – 0.125 | 14 | |
| | 5 | Th1-Th2 | 0.125 – 60.25 | 12 | |
| | 6 | Th1-Th2 | 0.25 – 0.375 | 10 | |
| | 7 | Th1-Th2 | 0.375 – 0.5 | 8 | |
| DL2 | 8 | Th2-Th3 | 0.0 – 0.125 | 14 | |
| | 9 | Th2-Th3 | 0.125 – 60.25 | 12 | |
| | 10 | Th2-Th3 | 0.25 – 0.375 | 10 | |
| | 11 | Th2-Th3 | 0.375 – 0.5 | 8 | |
| ML6 | NA | 0-Th3 | 0.5 – 0.75 | 0 | |
| BL3 | 12 | 0-Th1 | 0.75 – 0.8125 | 6 | NEW_K_BRIGHT |
| | 13 | 0-Th1 | 0.8125 – 0.875 | 8 | |
| | 14 | 0-Th1 | 0.875 – 0.9375 | 10 | |
| | 15 | 0-Th1 | 0.9375 – 1.0 | 12 | |
| BL4 | 16 | Th1-Th2 | 0.75 – 0.8125 | 6 | |
| | 17 | Th1-Th2 | 0.8125 – 0.875 | 8 | |
| | 18 | Th1-Th2 | 0.875 – 0.9375 | 10 | |
| | 19 | Th1-Th2 | 0.9375 – 1.0 | 12 | |
| BL5 | 20 | Th2-Th3 | 0.75 – 0.8125 | 3 | |
| | 21 | Th2-Th3 | 0.8125 – 0.875 | 4 | |
| | 22 | Th2-Th3 | 0.875 – 0.9375 | 5 | |
| | 23 | Th2-Th3 | 0.9375 – 1.0 | 6 | |

| 10 BIT ADDRESS TO THE EXPONENT TABLE | DECIMAL EQUIVALENT OF THE 10 BIT ADDRESS (FRACTIONAL PART OF THE NUMBER) | DECIMAL EQUIVALENT OF EXPONENT VALUE | BINARY EQUIVALENT OF THE EXPONENTIAL VALUE (VALUES STORED IN ROM TABLE) |
|---|---|---|---|
| 0 0 0 0 0 0 0 0 0 0 | 0.0000000000 | 1.000000000000 | 1 1 1 1 1 1 1 1 1 1 1 1 1 1 1 1 |
| 0 0 0 0 0 0 0 0 0 1 | 0.0009765625 | 0.999902391484 | 1 1 1 1 1 1 1 1 1 1 1 1 1 1 1 1 |
| 0 0 0 0 0 0 0 0 1 0 | 0.0019531250 | 0.980487824242 | 1 1 1 1 1 1 1 1 1 1 1 1 1 1 1 0 |
| 0 0 0 0 0 0 0 0 1 1 | 0.0029296875 | 0.997074660181 | 1 1 1 1 1 1 1 1 1 1 1 1 1 1 1 1 |
| 0 0 0 0 0 0 0 1 0 0 | 0.0039062500 | 0.996101372090 | 1 1 1 1 1 1 1 1 1 1 1 1 1 1 0 0 |
| 0 0 0 0 0 0 0 1 0 1 | 0.0048828125 | 0.995129092320 | 1 1 1 1 1 1 1 1 1 1 1 1 1 0 1 1 |
| 0 0 0 0 0 0 0 1 1 0 | 0.0058593750 | 0.994157761580 | 1 1 1 1 1 1 1 1 1 1 1 1 1 0 1 0 |
| 0 0 0 0 0 0 0 1 1 1 | 0.0068359375 | 0.993187378940 | 1 1 1 1 1 1 1 1 1 1 1 1 1 0 0 1 |
| 0 0 0 0 0 0 1 0 0 0 | 0.0078125000 | 0.992217794347 | 1 1 1 1 1 1 1 1 1 1 1 1 1 0 0 0 |
| 0 0 0 0 0 0 1 0 0 1 | 0.0087890625 | 0.991249454260 | 1 1 1 1 1 1 1 1 1 1 1 1 0 1 1 1 |
| 0 0 0 0 0 0 1 0 1 0 | 0.0097656250 | 0.990281910380 | 1 1 1 1 1 1 1 1 1 1 1 1 0 1 1 0 |
| • • • • • • • • • • | • | • | • • • • • • • • • • • • • • • • |
| • • • • • • • • • • | • | • | • • • • • • • • • • • • • • • • |
| • • • • • • • • • • | • | • | • • • • • • • • • • • • • • • • |
| 1 1 1 1 1 1 0 0 0 0 | 0.9921875000 | 0.370765002840 | 0 1 0 1 1 1 1 1 1 1 1 0 1 1 1 1 |
| 1 1 1 1 1 1 0 0 0 1 | 0.9931640625 | 0.370403104620 | 0 1 0 1 1 1 1 1 1 1 1 0 1 1 1 0 |
| 1 1 1 1 1 1 0 0 1 0 | 0.9941406250 | 0.370041559640 | 0 1 0 1 1 1 1 1 1 1 1 0 1 1 0 1 |
| 1 1 1 1 1 1 0 0 1 1 | 0.9951171875 | 0.369680367570 | 0 1 0 1 1 1 1 1 1 1 1 0 1 1 0 0 |
| 1 1 1 1 1 1 0 1 0 0 | 0.9960937500 | 0.369319528050 | 0 1 0 1 1 1 1 1 1 1 1 0 1 0 1 1 |
| 1 1 1 1 1 1 0 1 0 1 | 0.9970703125 | 0.368959040740 | 0 1 0 1 1 1 1 1 1 1 1 0 1 0 1 0 |
| 1 1 1 1 1 1 0 1 1 0 | 0.9980468750 | 0.368598905290 | 0 1 0 1 1 1 1 1 1 1 1 0 1 0 0 1 |
| 1 1 1 1 1 1 0 1 1 1 | 0.9990234375 | 0.368239121370 | 0 1 0 1 1 1 1 1 1 1 1 0 1 0 0 1 |

METHOD AND APPARATUS FOR DYNAMIC AND ADAPTIVE ENHANCEMENT OF COLORS IN DIGITAL VIDEO IMAGES

BACKGROUND

The recent rapid spread of digital video cameras and other diverse imaging devices facilitates easy accessibility of images in the form of digital data. Color image data derived from these devices consists of three color components red (R), green (G), and blue (B), corresponding to three primary colors of light. Some specific colors, that is, skin-tone, vegetation (green) and sky-sea (blue) generally tend to have emphasized visual effects in a color image. The user can easily identify, for example, even a slightly reddish tint or a slightly dim tint on the skin-tone in the color image, as well as, even slight differences among vegetation greens and sky-sea blues in the color image. These specific colors are visually recognizable in a distinctive manner from other colors.

Typically, color spaces such as HSV (Hue, Saturation, Value)/HSB (Hue, Saturation, Brightness) or HSI (Hue, Saturation, Intensity)/HSL (Hue, Saturation, Lightness) are more intuitive in manipulating color and are designed to approximate the way humans perceive and interpret color. The intuitive color spaces are related representations of points in an RGB color space, which attempt to describe perceptual color relationships more accurately than RGB. An intuitive correction technique is thus preferable for these colors in the color image. Conventionally, intuitive color enhancement/correction in these color spaces is performed by using one of the following techniques:

- Varying saturation component of a specific color
- Varying Hue component of a specific color
- Independently varying Hue, saturation and intensity components of a specific color Varying saturation component of a specific color alone may introduce artifacts (e.g., unwanted visible effects). For example, if a color region of a video frame is dark then varying saturation alone may not show-up any significant visually perceivable improvements in the color. If a portion of a color region of a video frame is white-highlight, (e.g., an overexposed face with flash light) saturation correction alone may show-up as artifacts. These artifacts may show-up due to color enhancement with saturation correction in white-highlight portion of interest not being visually perceivable while in surrounding areas it is visually perceivable. This can bring non-uniformity in a color region and hence, may appear as an artifact. Further, Hue component changes of a specific color may lead to unnatural colors and may also result in undesirable color shifts.

Currently, all three HSI components are independently varied using either look-up tables or piecewise linear (PWL) approximation methods. However using the look-up table method may require large amount of memory for storing look-up tables associated with various gains and hence, limits number of gains due to limited memory. Also in the PWL method, the transfer characteristics curve may have segments with varying slopes and/or sharp transitions and may suffer from visible artifacts.

In addition, to above said artifacts and unnatural color shifts with independent saturation and Hue component corrections, independent correction on intensity component of a video frame may also bring-about additional artifacts or may nullify visually perceivable improvement achieved by varying saturation component independently for color enhancement. For example, if both saturation and intensity components of a video frame are low and/or high, any correction to intensity component independently may bring up undesirable gray shades, such as shadows or may cause reduced vividness of color of interest and so on.

Furthermore, any enhancements with non-converging transfer characteristics curve corrections or gain under user control may lead, to over-saturation due to excess gain and there-by, result in clipping. Also, dynamic correction in video may cause flicker due to gain switching not being adaptable to slow or fast moving image sequences.

BRIEF DESCRIPTION OF THE DRAWINGS

Example embodiments are illustrated by way of example and not limitation in the figures of the accompanying drawings, in which like references indicate similar elements and in which:

FIG. 6 is an example table showing value and saturation ranges for the 24 bins, shown in the value-saturation 2D-histogram for the user chosen color of FIG. 5.

FIG. 11 is an example table showing the predefined new dark-gain and new bright-gain (new_K_dark and new_K_bright) which are used in the saturation dependant value dark-gain and value bright-gain dynamic calculation of FIG. 9 and FIG. 10 respectively, associated with the value-saturation 2D-histogram bins shown in FIG. 5.

FIG. 20 is an example fractional exponent read only memory (ROM) table, used in the saturation correction module and the value correction module shown in FIG. 18 and FIG. 19, respectively.

Other features of the present embodiments will be apparent from the accompanying drawings and from the detailed description that follows.

DETAILED DESCRIPTION

A method and apparatus for dynamic and adaptive enhancement and/or diminution, with concurrent enhancement of any number of user chosen colors, diminution of any number of user chosen colors, or any combination thereof, on a frame-by-frame basis to the incoming digital video signal is disclosed. In the following description, for purposes of explanation, numerous specific details are set forth in order to provide a thorough understanding of the various embodiments. It will be evident, however, to one skilled in the art that the various embodiments may be practiced without these specific details.

The terms "incoming digital video signal", "digital input video signal" and "digital video signal" are interchangeably used throughout the document. Also the terms "saturation" and "saturation component"; "value" and "value component"; "Hue" and "Hue component" are interchangeably used throughout the document. Further, in the document, "max" and "min" represent "maximum" and "minimum" respectively. The terms "image" and "video frame" are used interchangeably throughout the document. Further, the term "image sequence" means video frames.

Figure 1:
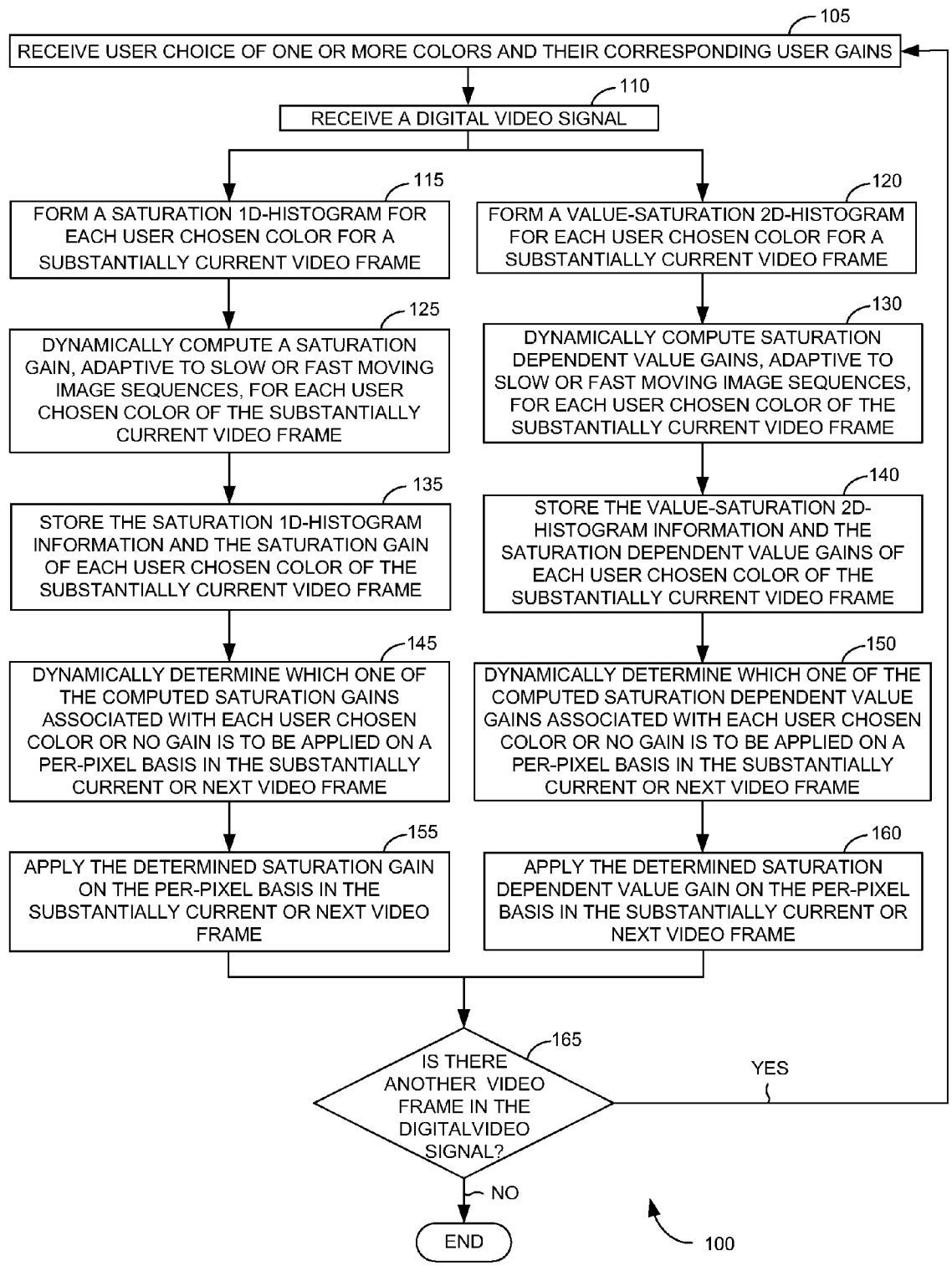
FIG. 1 is a process flow of dynamic and adaptive enhancement and/or diminution, with concurrent enhancement of any number of user chosen colors, diminution of any number of user chosen colors, or any combination thereof, on a frame-by-frame basis to an incoming digital video signal, according to an embodiment.

FIG. 1 is a process flow 100 of dynamic and adaptive enhancement and/or diminution, with concurrent enhancement of any number of user chosen colors, diminution of any number of user chosen colors, or any combination thereof, on a frame-by-frame basis to an incoming digital video signal, according to an embodiment. In operation 105, user choice of one or more colors and corresponding user gains to be applied in a substantially current video frame is received. In operation 110, a digital video signal is received. In operation 115, a saturation 1D-histogram for each user chosen color using the substantially current video frame is formed. In operation 120, a value-saturation 2D-histogram for each user chosen color using the substantially current video frame is formed.

In operation 125, a saturation gain, adaptive to slow or fast moving image sequences, for each user chosen color of the substantially current video frame is dynamically computed. In some embodiments, the saturation gain, adaptive to slow or fast moving image sequences, for each user chosen color of the substantially current video frame is dynamically computed using the corresponding color saturation 1D-histogram of the substantially current video frame and, corresponding color saturation 1D-histogram information and a saturation gain of a substantially previous video frame. In these embodiments, the substantially current video frame includes a plurality of pixels.

In operation 130, saturation dependent value gains (e.g., value dark-gain and value bright-gain), adaptive to slow or fast moving image sequences, for each user chosen color of the substantially current video frame is dynamically computed. In some embodiments, the saturation dependent value gains, adaptive to slow or fast moving image sequences, for each user chosen color are dynamically computed using the corresponding color value-saturation 2D-histogram of the substantially current video frame and corresponding color value-saturation 2D-histogram information and saturation dependent value gains of the substantially previous video frame.

In operation 135, information associated with the saturation 1D-histogram and the saturation gain of the substantially current video frame for each user chosen color are stored in memory. In operation 140, information associated the value-saturation 2D-histogram and the saturation dependant value gains (e.g., value dark-gain and value bright-gain) for each user chosen color of the substantially current video frame are stored in memory. In operation 145, it is determined which one of the dynamically computed saturation gains associated with each user chosen color or no gain is to be applied on a per-pixel basis in the substantially current or next video frame. In operation 150, it is determined which one of the dynamically computed saturation dependent value gains (e.g., value dark-gain and value bright-gain) associated with each user chosen color or no gain is to be applied on a per-pixel basis in the substantially current or next video frame. In the above operations 145 and 150, the determination is made by comparing Hue, saturation and value components (HSV) of each pixel with predefined HSV ranges of various user chosen colors respectively.

In operation 155, the determined saturation gain is applied on the per-pixel basis, in the substantially current or next video frame. In operation 160, the determined saturation dependent value gain (e.g., value dark-gain or value bright-gain or no gain) is applied on the per-pixel basis, in the substantially current or next video frame. In some embodiments, applying the determined saturation and saturation dependent value gains on the per-pixel basis, in the substantially current or next video frame includes receiving a user gain for each user chosen color to be applied to the substantially current video frame and applying a non-linear saturation and value transfer characteristics curve corrections based on the determined saturation gain and value dark-gain or value bright-gain of the corresponding pixel respectively, and the received user gain for each user chosen color in the substantially current or next video frame.

In one embodiment, in applying the non-linear saturation enhancement transfer characteristics curve correction, the saturation enhancement correction on the per-pixel basis for various user chosen colors, is computed using the following equation:

$$S_{out}=S_{in}+\{G*[(\text{sat\_}K*(\text{Exp}(-(S_{in}-S_m)^2/((S_h-S_{in})*(S_{in}-S_l))))-\text{Offset}]*\text{Buff}\}$$

where, $S_{in}$ refers to saturation component of the input pixel, sat_K refers to determined saturation gain, G refers to a user gain, Buff refers to Hue buffer region correction=1 for H1≦H≦H2, (H1−H+20)/20 for H1−20<H<H1 and (H2+20−H)/20 for H2<H<H2+20, Offset refers to offset added for adjusting the saturation enhancement equation to provide desired correction in case of saturation diminution, $S_m$ refers to a saturation point, where peak gain is applied, $S_l$ refers to minimum saturation point considered for correction, $S_h$ refers to maximum saturation point considered for correction, Exp( ) refers to exponential function, and $S_{out}$ refers to enhanced saturation component output.

For example, the user gain for the user chosen color is a user defined parameter which defines the amount of relative strength of determined gains to be applied to the substantially current or next video frame. The example user gain for the user chosen color can be of any value in negative (−1 to 0) or positive (0 to 1) range for color diminution or enhancement respectively. It should be noted that the user gain (−1 to 0) corresponds to maximum to minimum diminution user choice and user gain (0 to 1) corresponds to minimum to maximum enhancement user choice.

In another embodiment, in applying the non-linear value transfer characteristics curve correction, the value component correction, based on the value dark-gain or the value bright-gain, on the per-pixel basis for various user chosen colors, is computed using equation:

$$V_{out}=V_{in}+\{\text{val\_}K\_\text{dark}*\text{Exp}[-(V_{in}-V_m)^2/((V_{h\_dark}-V_{in})*(V_{in}-V_{l\_dark}))]*\text{Buff}\},$$

for $0\leq V_{in} \leq (3*(\text{full scale value range}))/4$, and $$V_{out}=V_{in}-\{\text{val\_}K\_\text{bright}*\text{Exp}[-(V_{h\_bright}-V_{in})/(V_{in}-V_{l\_bright})]*\text{Buff}\},$$

for (3*(full scale value range))/4<$V_{in}$≦(full scale value range)

where $V_{in}$ refers to value component of the input pixel, val_K_dark refers to determined value dark-gain, $V_m$ refers to the value point, where peak gain is applied, $V_{l\_dark}$ refers to minimum value point considered for applying value dark-gain, which is 0, $V_{h\_dark}$ refers to maximum value point considered for applying value dark-gain, which is (3*(full scale value range))/4, Buff refers to Hue buffer region correction=1 for H1≦H≦H2, (H1−H+20)/20 for H1−20<H<H1 and (H2+20−H)/20 for H2<H<H2+20, Exp( ) refers to exponential function, $V_{out}$ refers to enhanced value component output, val_K_bright refers to determined value bright-gain, $V_{l\_bright}$ refers to minimum value point considered for applying value bright-gain, which is (3*(full scale value range))/4, $V_{h\_bright}$ refers to maximum value point considered for applying value bright-gain, which is (full scale value range).

In operation 165, it is determined whether there is another video frame in the incoming digital video signal. If there is another video frame in the incoming digital video signal, then the process 100 goes back to operation 105 and repeats operations 105 to 160 for a next video frame. If it is determined that there are no more video frames in the incoming digital video signal, the process of dynamic and adaptive enhancement and/or diminution, with concurrent enhancement of any number of user chosen colors, diminution of any number of user chosen colors, or any combination thereof, on a frame-by-frame basis to the incoming digital video signal is stopped.

Figures 2, 3:
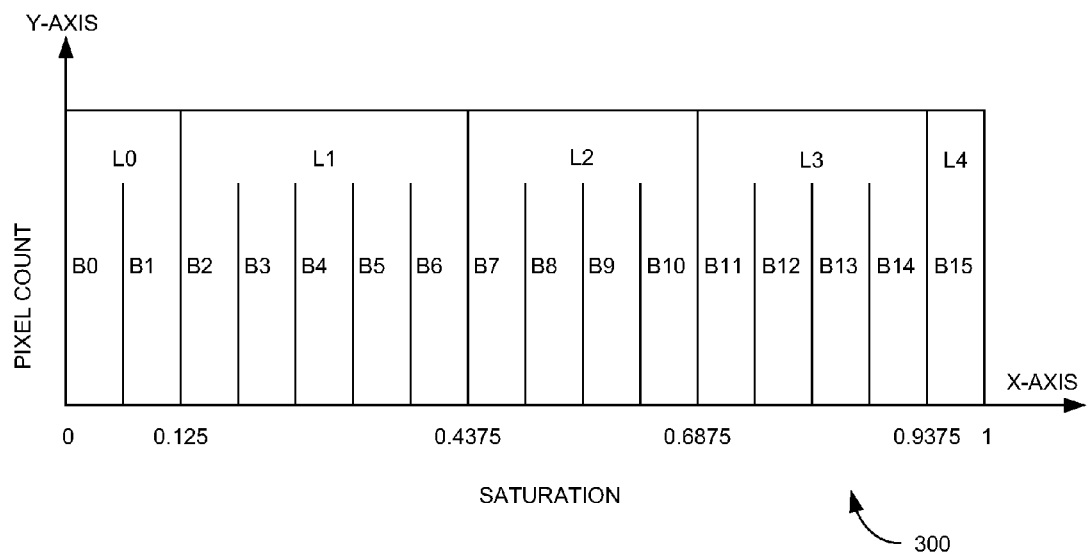
FIG. 2 is an example table illustrating predefined Hue, saturation and value (HSV) component ranges for various example user chosen colors.
FIG. 3 illustrates a saturation 1D-histogram for a user chosen non-skin-tone color of a substantially current video frame, according to one embodiment.

FIG. 2 is an example table 200 illustrating predefined Hue, saturation and value (HSV) component ranges for various example user chosen colors. In the example embodiment, the table 200 represents three example colors, namely vegetation (green), sky-sea (blue) and skin-tone, which can be selected by a user for enhancement and/or diminution in digital video images. It should be noted that colors other than skin-tone color such as vegetation (green), sky-sea (blue) and others are termed as non-skin-tone colors. Further, the table 200 illustrates a full scale range of Hue, saturation and value components in HSV color space. For example, the Hue full scale range is from 0° to 360° (of angle), the saturation full scale range is from 0 to 1 and the value full scale range is from 0 to 1. In addition, the table 200 shows optimum example ranges of Hue, saturation and value components for the said three example user chosen colors, namely vegetation (green), sky-sea (blue) and skin-tone.

As illustrated in FIG. 2, the predefined minimum value of the Hue component for vegetation, sky-sea and skin-tone colors are respectively 65°, 180° and 330° and the predefined maximum value of the Hue component are respectively 165°, 275° and 30°. Similarly, the vegetation, sky-sea and skin-tone colors have predefined saturation range minimum as 0 and maximum as 1, 1 and 0.6 respectively. Also, it can been seen from the table 200 that the vegetation, sky-sea and skin-tone colors have predefined value range minimum as 0, 0 and 0.16 respectively while the maximum is 1 for all the three example user chosen colors. It can be noted that each pixel in a substantially current or next video frame is categorized based on the predefined ranges of HSV components (e.g., as shown in FIG. 2) prior to applying correction to the substantially current or next video frame.

FIG. 3 illustrates a saturation 1D-histogram 300 for a user chosen non-skin-tone color of a substantially current video frame, according to one embodiment. Particularly, FIG. 3 illustrates 'N' equally divided bins (e.g., 16 (B0 to B15)) with bin width as (max saturation−min saturation)/N for full scale saturation range of 0 to 1. In this example, the bin width is 0.0625.

As shown in FIG. 3, size of each bin in the saturation 1D-histogram 300 is based on equal divisions of predefined saturation range as represented by X-axis (or the saturation axis). The height of each bin (Y-axis) represents number of pixels (pixel count) in the substantially current video frame, having saturation within the predefined ranges for each respective bin. In one embodiment, the pixels whose Hue component is in the predefined Hue range of the user chosen color as per table 200 of FIG. 2, qualify for this histogram.

Further, saturation and value components of histogram qualified pixels determine in which bin the pixels should be counted for. As shown in FIG. 3, there are 'N' bin counters, one for each bin and whenever an incoming histogram qualified pixel further qualifies for a particular bin of the saturation 1D-histogram, the counter corresponding to that bin is incremented, which is the pixel count of that particular bin. Further, as shown in FIG. 3, the 16 bins are further grouped into five lots—L0 to L4, which are defined as:

Lot L0=(Sum of pixel count in B0 and B1 bins)/2
Lot L1=(Sum of pixel count in B2, B3, B4, B5 and B6 bins)/5
Lot L2=(Sum of pixel count in B7, B8, B9 and B10 bins)/4
Lot L3=(Sum of pixel count in B11, B12, B13 and B14 bins)/4
Lot L4=pixel count of B15 bin In one or more embodiments, pixel count of all the bins in lots L0 to L4 is defined as total-pixel-count of a user chosen non-skin-tone color.

Figure 4:
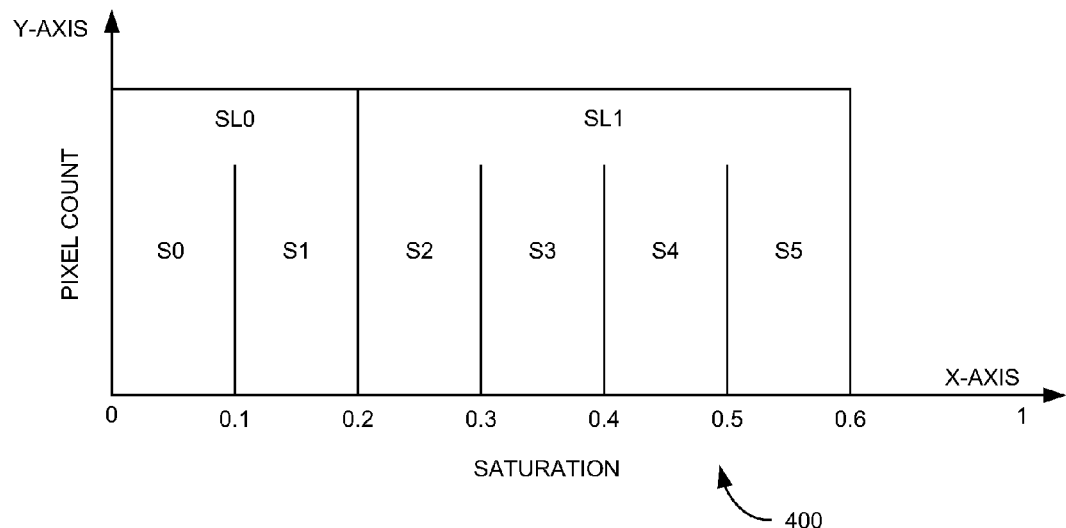
FIG. 4 illustrates a saturation 1D-histogram for a user chosen skin-tone color of a substantially current video frame, according to one embodiment.

FIG. 4 illustrates a saturation 1D-histogram 400 for a user chosen skin-tone color of a substantially current video frame, according to one embodiment. Particularly, FIG. 4 illustrates 'M' equally divided bins (e.g., 6 (S0 to S5) in this example) with bin width as (max saturation−min saturation)/M (i.e., 0.1 in this example) for predefined saturation range of 0 to 0.6. The 6 bins are further grouped into two lots—SL0 and SL1 as shown in FIG. 4, which are defined as:

Lot SL0=(Sum of pixel count in S0 and S1 bins)/2

Lot SL1=(Sum of pixel count in S2, S3, S4 and S5 bins)/4

In one or more embodiments, pixel count of all the bins in lots SL0 and SL1 is defined as total-pixel-count for a user chosen skin-tone color. Further, based on the saturation 1D-histogram, characteristics of the substantially current video frame can be determined. If the majority of the pixels lie towards the lower bins of the saturation 1D-histogram 400, then the pixels of interest are mostly pastel shades and if the pixels are towards the upper bins of the saturation 2D-histogram, then the pixels of interest are bright colored.

Figure 5:
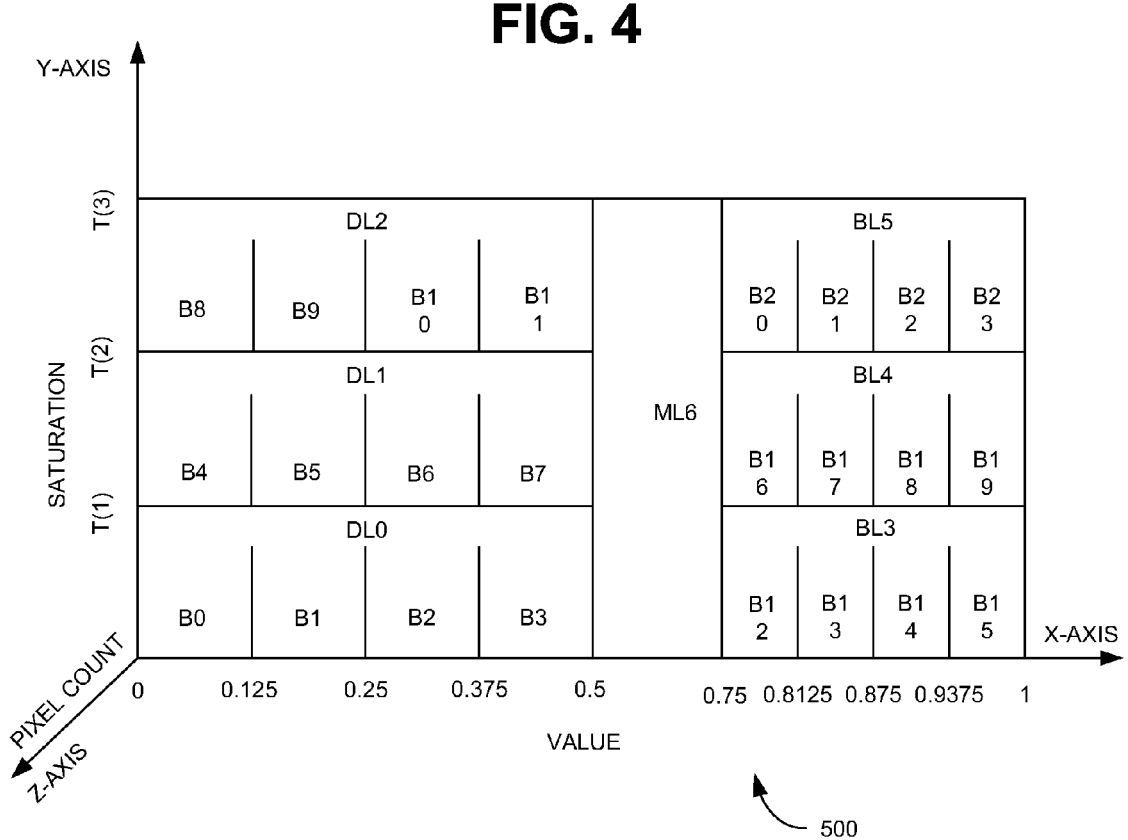
FIG. 5 illustrates a value-saturation 2D-histogram for a user chosen color of a substantially current video frame, according to one embodiment.

FIG. 5 illustrates a value-saturation 2D-histogram 500 for a user chosen color of a substantially current video frame, according to one embodiment. Particularly, FIG. 5 illustrates X-axis as value axis, Y-axis as saturation axis and Z-axis as pixel count axis. The full scale range of value component on X-axis has been divided into three regions namely dark-region, mid-tone-region and bright-region. The range of values between 0 to (full scale value range)/2, (full scale value range)/2 to (3*(full scale value range))/4 and (3*(full scale value range))/4 to (full scale value range) are defined as dark-region, mid-tone-region and bright-region respectively.

Generally, the dark-region pixels are gray or dark colored, based on the saturation of those pixels. The bright-region pixels are pastel or bright colored, based on the saturation of those pixels. Hence, there is a need for saturation dependent value component correction.

As shown in FIG. 5, the dark-region of value on X-axis is sub-divided into 'P' bins (e.g., 4 bins as illustrated in FIG. 5) of equal width as (full scale value range)/(2*P), where as, the bright-region of value on X-axis is sub-divided into 'Q' bins (e.g., 4 bins as illustrated in FIG. 5) of equal width, defined by (full scale value range)/(4*Q).

The predefined range of saturation on Y-axis is divided into 'R' bins (e.g., 3 bins as illustrated in FIG. 5) of equal width with boundary points as T(1), T(2), . . . , T(R), such that T(2) which is 2*T(1) up to T(R) which is R*T(1). Further, each bin with width equal to T(1), is defined as T(R)/R. It can be noted that, based on whether to enhance skin-tone or non-skin-tone user chosen colors, the three saturation bins are having different saturation ranges. For example, for skin-tone user chosen color, saturation bins boundary points for R=3 are T(1)=0.2, T(2)=0.4 and T(3)=0.6, and for non-skin-tone user chosen colors, saturation bins boundary points for R=3 are T(1)=0.375, T(2)=0.6875 and T(3)=1.

Thus, the value-saturation 2D-histogram 500 has (P+Q)*R bins (e.g., 24 bins (B0 to B23) as illustrated in FIG. 5) excluding the mid-tone-region. For the pixels, whose Hue component is in the predefined Hue range of the user chosen color as per table 200 of FIG. 2 qualifies for the value-saturation 2D-histogram 500.

The 24 bins of the value-saturation 2D-histogram are further grouped into 6 lots as shown in FIG. 5, which are defined as:

Lot DL0=Sum of pixel count in B0, B1, B2 and B3 bins. In this lot, pixels are of low value and low saturation and are dark/gray colored Lot DL1=Sum of pixel count in B4, B5, B6 and B7 bins. In this lot, pixels are of low value and mid saturation Lot DL2=Sum of pixel count in B8, B9, B10 and B11 bins. In this lot, pixels are of low value and high saturation and are dark colored Lot BL3=Sum of pixel count in B12, B13, B14 and B15 bins. In this lot, pixels are of high value and low saturation and are mostly pastel shades Lot BL4=Sum of pixel count in B16, B17, B18 and B19 bins. In this lot, pixels are of high value and mid saturation Lot BL5=Sum of pixel count in B20, B21, B22 and B23 bins. In this lot, pixels are of high value and high saturation and are bright colored The saturation and value components of histogram qualified pixels determine in which bin of the value-saturation 2D-histogram 500, the pixels should be counted for. The histogram qualified pixels which do not fall into any of the said 24 bins are grouped as mid-tone lot (ML6). It should be noted that DL0, DL1 and DL2 lots correspond to the dark-region, BL3, BL4 and BL5 lots correspond to the bright-region and ML6 corresponds to the mid-tone-region.

FIG. 6 is an example table 600 showing value and saturation ranges for the 24 bins, shown in the value-saturation 2D-histogram for the user chosen color of FIG. 5. Particularly, the table 600 illustrates value and saturation ranges for P=4, Q=4 and R=3. P is the number of bins in the value dark-region, Q is the number of bins in the value bright-region and R is the number of bins on the saturation axis.

Figure 7:
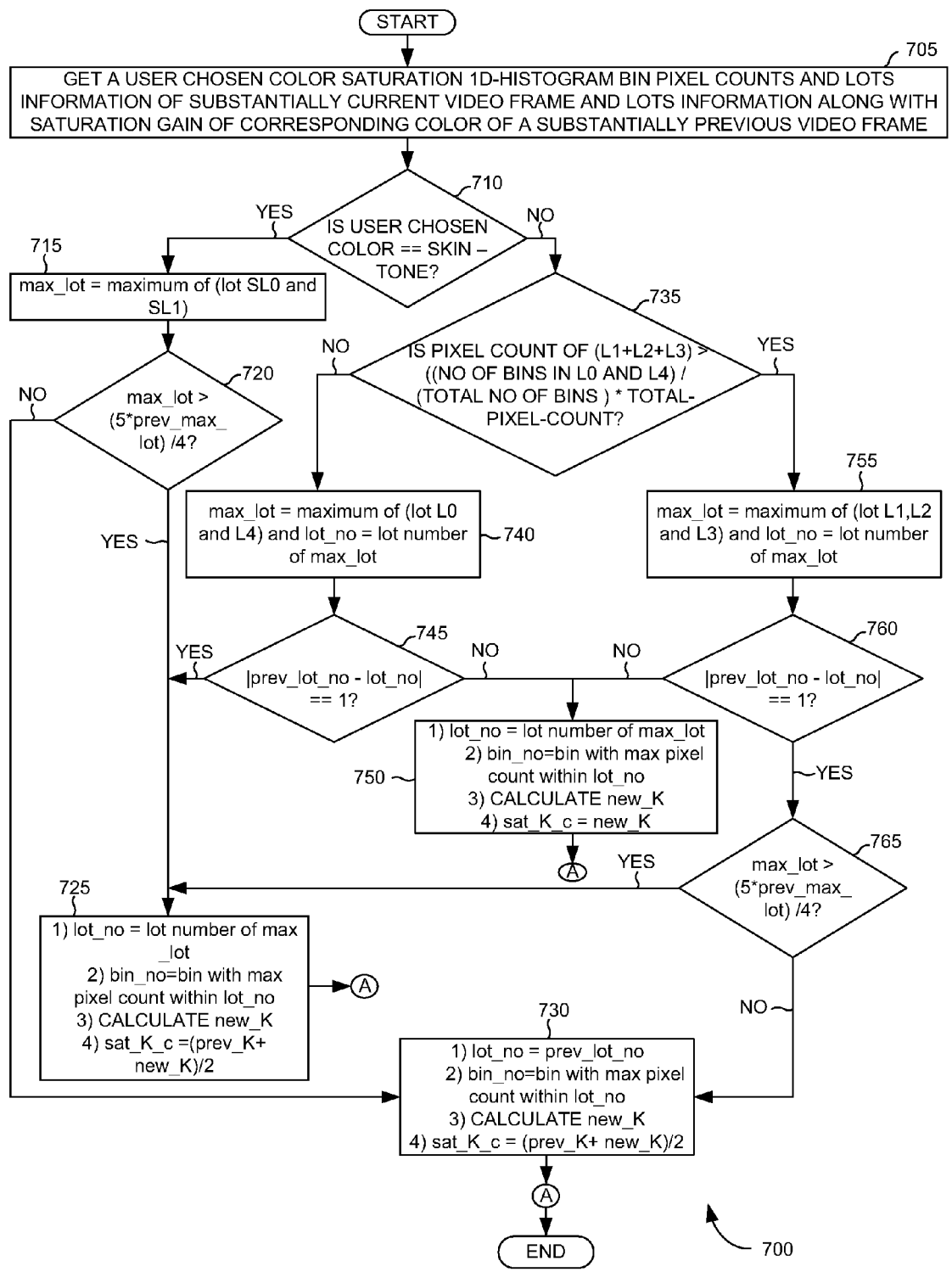
FIG. 7 is a flowchart illustrating dynamic calculation of saturation gain, adaptive to slow or fast moving image sequences, for a user chosen skin-tone or non-skin-tone color of a substantially current video frame, according to an embodiment.

FIG. 7 is a flowchart 700 illustrating dynamic calculation of saturation gain, adaptive to slow or fast moving image sequences, for a user chosen skin-tone or non-skin-tone color of a substantially current video frame, according to an embodiment. The changes in bin pixel concentration of a saturation 1D-histogram of the substantially current video frame compared to that of a substantially previous video frame along with a saturation gain of the substantially previous video frame are considered for dynamically calculating the saturation gain of the substantially current or next video frame. If the substantially previous and current video frame's saturation 1D-histogram lots with maximum pixel count are adjacent to each other (e.g., slow moving video frame sequence), then the amount of saturation gain to be applied on the substantially current or next video frame depends on the substantially current video frame and the saturation gain of the substantially previous video frame. If the saturation 1D-histogram lots with maximum pixel count of the substantially current and previous video frames are not adjacent to each other (e.g., fast moving video frame sequences), then amount of saturation gain to be applied on the substantially current or next video frame depends only on the substantially current video frame and does not depend on the saturation gain of the substantially previous video frame. This method of dynamic saturation gain calculation ensures that the saturation gains applied on the consecutive video frames are adaptive to slow or fast moving image sequences and thereby avoids flicker.

In step 705, user chosen color saturation 1D-histogram bin pixel counts and lots information of the substantially current video frame and corresponding color saturation 1D-histogram lots information along with a saturation gain of a substantially previous video frame are obtained. In step 710, a condition check is made to determine whether user chosen color is skin-tone or non-skin-tone color. If the skin-tone color is chosen by the user, lot with maximum pixel count in the substantially current video frame (max_lot) is found among the computed lots (SL0 and SL1) of the saturation 1D-histogram (e.g., shown in FIG. 4), in step 715.

In step 720, a condition check is done to determine an amount of change in the substantially current video frame lot with maximum pixel count (e.g., max_lot), compared to that of a substantially previous video frame's lot with maximum pixel count (prev_max_lot). If the amount of change exceeds a predetermined threshold, (e.g., (5*prev_max_lot)/4), it is to be implied that a considerable number of pixels have moved from the substantially previous video frame lot with maximum pixel count to the substantially current video frame lot with maximum pixel count. Hence in step 725, gain corresponding to the bin with maximum pixel count (bin_no) within the bins of the lot number of max_lot (lot_no) in the substantially current video frame's saturation 1D-histogram is calculated as new gain (new_K) and averaged with saturation gain of the substantially previous video frame (prev_K) to calculate saturation gain (sat_K_c) of the substantially current or next video frame (i.e., sat_K_c=(prev_K+new_K)/2).

In step 720, if the amount of change does not exceed the predetermined threshold, it is to be implied that the pixel movement is more within the bins of the lot with maximum pixel count of the substantially previous video frame. Hence in step 730, gain corresponding to the bin with maximum pixel count (bin_no) within the bins of the lot number of prev_max_lot (prev_lot_no) in the substantially current video frame's saturation 1D-histogram is calculated as new gain (new_K) and averaged with the substantially previous video frame saturation gain (prev_K) to calculate a saturation gain (sat_K_c) of the substantially current or next video frame.

In accordance with the steps 715, 720, 725 and 730, in case of skin-tone, the calculated new gain (new_K) is averaged with the substantially previous video frame saturation gain (prev_K) since there are only two lots (e.g., SL0 and SL1 in case of skin-tone color) and the pixel movement would be either within the lot or to the adjacent lot. Since the movement is considered to be minimal in either case, considerable increment in saturation gain is avoided by averaging with the substantially previous video frame saturation gain (prev_K). It can be noted that by dynamically computing the saturation gain, adaptive to slow or fast moving image sequences, using the above-described method, flickering that may occur due to sudden variation in gain is avoided.

If a non-skin-tone color is chosen by the user (i.e., in step 710), lots L0 and L4 (i.e., that correspond to pastel shades and bright colors respectively) are considered for saturation gain calculation only when considerable number of pixels do not exist in other lots (L1, L2 and L3) of corresponding non-skin-tone color saturation 1D-histogram. The process 700 performs step 735, if the user chosen color is non-skin-tone color. In step 735, a condition is checked to determine whether sum of pixel count in the lots (L1, L2, and L3) is greater than ((Number of bins in L0 and L4)/N)*total-pixel-count or not. If the sum of pixel count in the lots (L1, L2, and L3) is less than or equal to ((Number of bins in L0 and L4)/N)*total-pixel-count, a considerable number of pixels do not exist in the lots L1, L2 and L3. Under this condition, a lot with maximum pixel count (max_lot) from the lots (L0 and L4) and lot number of max_lot (lot_no) is calculated in step 740.

In step 745, a condition is checked to determine whether |prev_lot_no−lot_no|=1, where prev_lot_no is substantially previous video frame's maximum pixel count (prev_max_lot) lot number. In some embodiments, a substantially current video frame histogram bin lot is said to be adjacent to that of a substantially previous video frame lot if |prev_lot_no−lot_no|=1. If the substantially current video frame lot_no satisfies the adjacency condition, it is to be implied that there is a small change in the characteristics of the substantially current video frame compared to substantially previous video frame characteristics (i.e., slow moving video frame sequence) and thus a saturation gain (sat_K_c) is calculated as in step 725. If adjacency condition in step 745 fails, it is to be implied that there is a large change in the substantially current video frame characteristics compared to the substantially previous video frame characteristics and hence, gain corresponding to the bin with maximum pixel count (bin_no) within the bins of the lot number of max_lot (lot_no) in the substantially current video frame's saturation 1D-histogram is calculated as new gain (new_K) and assigned as saturation gain (sat_K_c) of the substantially current or next video frame in step 750.

In step 735, if the sum of pixel count in the lots (L1, L2, and L3) is greater than ((No of bins in L0 and L4)/N)*total-pixel-count, a considerable number of pixels exist in the lots L1, L2 and L3. Thus, the lot with maximum pixel count is found (i.e., max_lot=Maximum of (Lot L1, L2 and L3)) and corresponding lot number (1 or 2 or 3) of max_lot is assigned to lot_no in step 755.

In step 760, an adjacency condition check (i.e., |prev_lot_no−lot_no|=1) is done for the lot with maximum pixel count among the lots L1, L2 and L3. If adjacency condition check fails, the saturation gain (sat_K_c) of the substantially current or next video frame is calculated as in step 750. If adjacency condition check in step 760 passes, an additional check is done to further quantify the amount of change by comparing the lots with maximum pixel count of the substantially previous (prev_max_lot) and current (max_lot) video frames in step 765. If the amount of change exceeds a predetermined threshold, (e.g., max_lot>(5*prev_max_lot)/4), it is to be implied that a considerable number of pixels have moved from the substantially previous video frame lot with maximum pixel count to the substantially current video frame lot with maximum pixel count and hence, a saturation gain (sat_K_c) is calculated as in step 725.

If the amount of change in the movement of pixels does not exceed the predetermined threshold in step 765, it is to be implied that the pixel movement is more within the bins of the lot with maximum pixel count of the substantially previous video frame, and a saturation gain (sat_K_c) is calculated as in step 730. In one example embodiment, the manner in which flickering may occur due to sudden variation in gain is avoided in fast or slow moving image sequences using the above described saturation gain dynamic calculation method and hence is adaptive.

Figure 8:
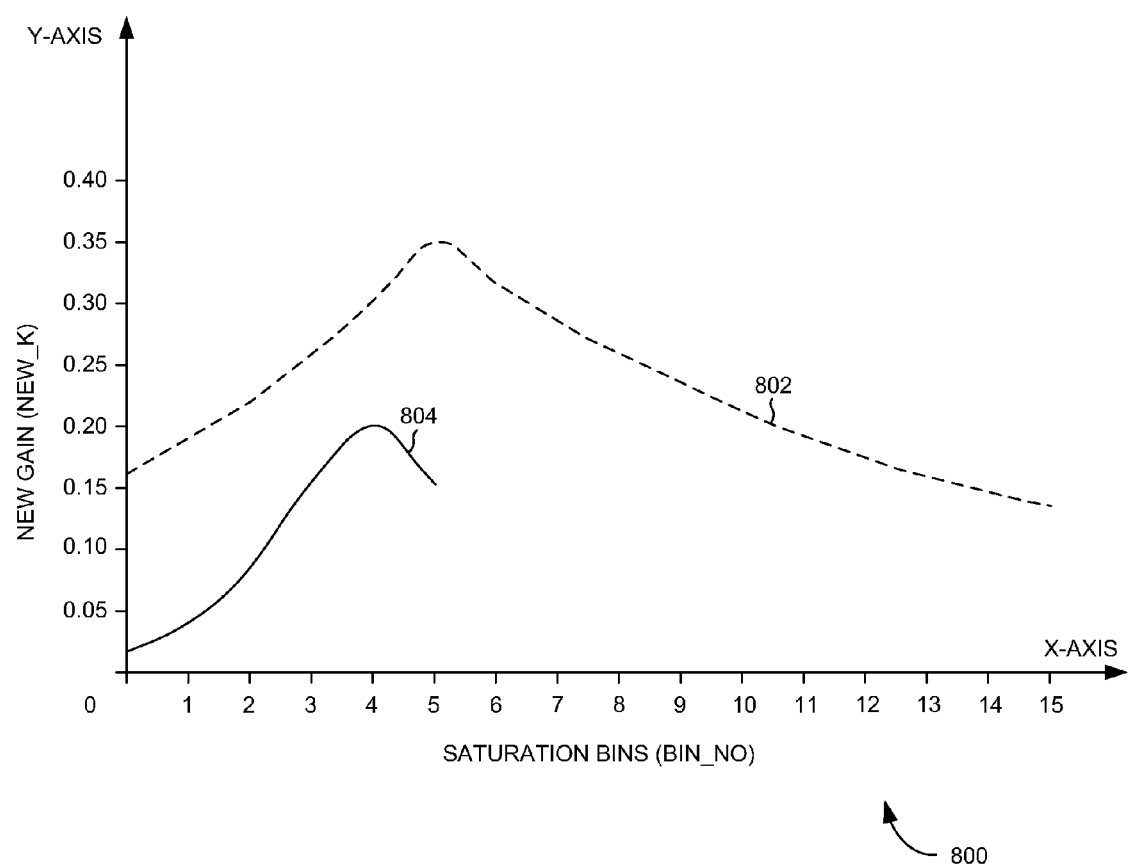
FIG. 8 is an example graph illustrating new gains (new_K) which are used in saturation gain dynamic calculation of FIG. 7, associated with the saturation 1D-histogram bins (bin_no) shown in FIGS. 3 and 4.

The new gain (new_K) of the substantially current video frame referred in various steps of FIG. 7 is calculated using bin_no of corresponding step by using example graph illustrated in FIG. 8.

FIG. 8 is an example graph 800 illustrating new gains (new_K) which are used in saturation gain dynamic calculation of FIG. 7, associated with the saturation 1D-histogram bins (bin_no) shown in FIGS. 3 and 4. Particularly, the graph 800 illustrates a new gain (new_K) curve 802 for user chosen non-skin-tone colors and a new gain (new_K) curve 804 for a user chosen skin-tone color with saturation bins (bin_no) represented along X-axis and a new gain (new_K) represented along Y-axis.

As shown in FIG. 8, substantially current video frame's new gain is calculated from one of the 16 bins for the user chosen non-skin-tone colors, while, for the user chosen skin-tone color, the new gain (new_K) is calculated from one of the 6 bins. It can be noted that the substantially current video frame's new gain (new_K) for each of the N saturation bins (16 in this example) for the user chosen non-skin-tone colors and for each of the M saturation bins (6 in this example) for the user chosen skin-tone color is predefined in such a way that, flickering does not appear in slow or fast moving image sequences. Further, the new gain curves 802 and 804 represent predefined bin based new gain values for the user chosen non-skin-tone and skin-tone colors respectively.

It can be seen from FIG. 8 that for the user chosen non-skin-tone colors, peak new gain is predefined to saturation bin 5, which tapers off in lower and upper bins. It can be noted that enhancement applied to pixels corresponding to saturation bins 3 to 7 leads to visually perceivable major enhancement to the image. Similarly, for the user chosen skin-tone color, peak new gain is predefined to saturation bin 4, which tapers off in lower and upper bins.

Figure 9:
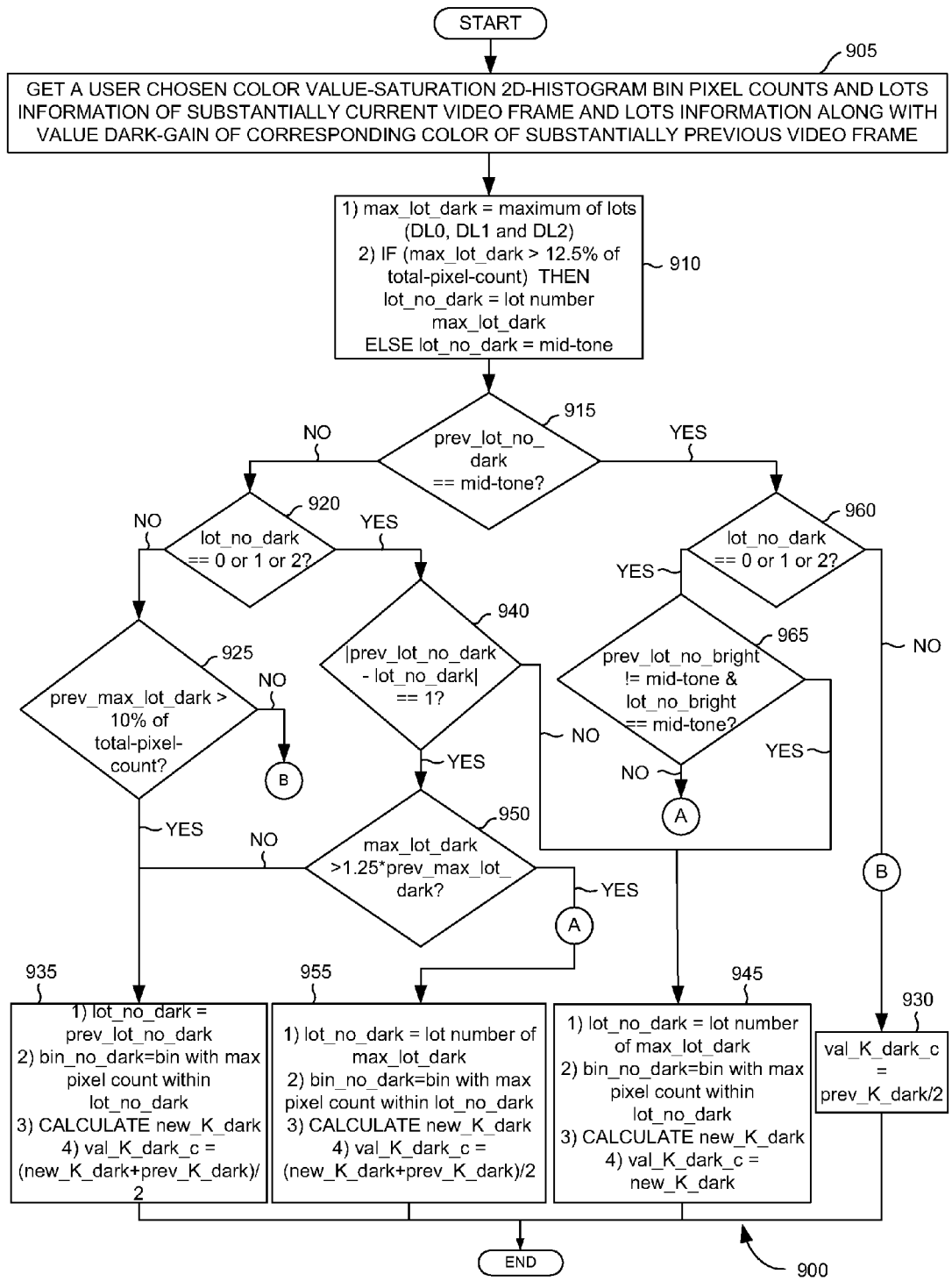
FIG. 9 is a flowchart illustrating dynamic calculation of saturation dependant value dark-gain, adaptive to slow or fast moving image sequences, for a user chosen color of a substantially current video frame, according to an embodiment.

FIG. 9 is a flowchart 900 illustrating dynamic calculation of saturation dependant value dark-gain, adaptive to slow or fast moving image sequences, for a user chosen color of a substantially current video frame, according to an embodiment. The changes in bin pixel concentration of a value-saturation 2D-histogram of the substantially current video frame compared to that of a substantially previous video frame along with a saturation dependant value dark-gain of the substantially previous video frame are considered for dynamically calculating the saturation dependant value dark-gain, adaptive to slow or fast moving image sequences of the substantially current or next video frame.

In one embodiment, if substantially previous and current video frame value-saturation 2D-histogram lots with maximum pixel count are adjacent to each other (e.g., slow moving video frame sequence), then the amount of value dark-gain to be applied on the substantially current or next video frame depends on the substantially current video frame and the saturation dependant value dark-gain of the substantially previous video frame.

In another embodiment, if the value-saturation 2D-histogram lots with maximum pixel count of the substantially current and previous video frames are not adjacent to each other (e.g., fast moving video frame sequences), then the amount of value dark-gain to be applied on the substantially current or next video frame depends only on the substantially current video frame and does not depend on the saturation dependant value dark-gain of the substantially previous video frame. This method of saturation dependant value dark-gain dynamic calculation ensures that the saturation dependant value dark-gain applied on the consecutive video frames are adaptive to slow or fast moving image sequences and thereby avoids flicker.

In step 905, value-saturation 2D-histogram bin pixel counts and lots information of the substantially current video frame for a user chosen color and lots information along with saturation dependent value dark-gain for corresponding color of a substantially previous video frame are obtained. In step 910, a lot with maximum pixel count (max_lot_dark) is found among the lots DL0, DL1, and DL2 of the value-saturation 2D-histogram for the user chosen color of the substantially current video frame. In one embodiment, if more than one lot is having same pixel count, then lower lot number is considered as max_lot_dark. If the max_lot_dark has pixel count greater than the predetermined threshold (e.g., 12.5% of total-pixel-count), it is to be implied that majority of the pixel concentration lies in that lot, then the lot number (0 or 1 or 2) of max_lot_dark is assigned to lot_no_dark. If not, lot number of the mid-tone lot (e.g., 6 for ML6) is assigned to lot_no_dark.

In step 915, a condition check is done to determine whether the dark lot number of maximum pixel count of the substantially previous video frame (prev_lot_no_dark) is mid-tone (i.e., 6) or not. If prev_lot_no_dark is not a mid-tone, then a check is done to determine whether lot_no_dark is 0 or 1 or 2 in step 920. If it is determined that lot_no_dark is not 0 or 1 or 2, it is to be implied that lot_no_dark is mid-tone and to quantify the amount of value dark-gain to be applied, a further condition check is done in step 925 to check whether prev_max_lot_dark is having a pixel count greater than a predetermined threshold (e.g., 10% of total-pixel-count) in the substantially current video frame's value-saturation 2D-histogram.

If the check done in step 925 is false, then it is to be implied that majority of pixels have moved from dark-region of the substantially previous video frame to mid-tone-region of the substantially current video frame, and hence no value dark-gain is to be applied to the substantially current or next video frame, as it is in mid-tone-region. However, during transition from dark-region to mid-tone-region video frame sequence, the value dark-gain cannot be made zero abruptly, as it may result in flicker, so the value dark-gain of the substantially previous video frame (prev_val_K_dark) is halved and applied as the saturation dependant value dark-gain (val_K_dark_c) for the substantially current or next video frame in step 930, which gradually tends to zero in subsequent mid-tone frames if any, thereby avoiding flicker.

The saturation dependant value dark-gain applied on the substantially current or next video frame during said transition from dark-region to mid-tone-region video frame sequences is also termed as "carry-forward-dark-gain". Alternatively, if the check done in step 925 is true, then it is to be implied that considerable amount of pixels are lying in the dark-region and hence, gain corresponding to the bin with maximum pixel count (bin_no_dark) within the bins of the lot number of prev_max_lot_dark (prev_lot_no_dark) in the substantially current video frame's value-saturation 2D-histogram is calculated as new dark-gain (new_K_dark) and averaged with the saturation dependant value dark-gain of the substantially previous video frame (prev_K_dark) to calculate a saturation dependant value dark-gain (val_K_dark_c) of the substantially current or next video frame in step 935.

Further, if the check done in step 920 is true, then step 940 is performed to identify the nature of pixel movement. In step 940, an adjacency condition check is done in which, a substantially previous video frame lot is said to be adjacent to a substantially current video frame lot, if and only if |prev_lot_no_dark−lot_no_dark|=1. If the adjacency check is false in step 940, it is to be implied that the pixels have moved either from DL0 to DL2 or vice-versa, which is considered to be a sudden change in the substantially current video frame characteristics compared to the substantially previous video frame characteristics. Hence, gain corresponding to the bin with maximum pixel count (bin_no_dark) within the bins of the lot number of max_lot_dark (lot_no_dark) in the substantially current video frame's value-saturation 2D-histogram is calculated as new dark-gain (new_K_dark) and assigned as val_K_dark_c of the substantially current or next video frame in step 945.

If the adjacency check done in step 940 is true, it is to be implied that the pixels have moved either between DL0 and DL1 or DL1 and DL2, which is considered to be a small change in the substantially current video frame characteristics, compared to the substantially previous video frame characteristics. Thus, if adjacency condition check is true, then step 950 is performed to further quantify the amount of pixel movement. In step 950, a condition check is done to determine whether max_lot_dark is greater than prev_max_lot_dark by a predefined threshold (e.g., 25%).

If the check done in step 950 is false, it is to be implied that considerable number of pixels have not moved into lot_no_dark from prev_lot_no_dark, which is considered to be a small change. Hence, val_K_dark_c is calculated as in step 935. If the condition check done in step 950 is true, it is to be implied that a considerable number of pixels have moved into lot_no_dark from prev_lot_no_dark, but still considered to be a small change, as it satisfied the adjacency condition in step 940. Hence gain corresponding to the bin with maximum pixel count (bin_no_dark) within the bins of the lot number of max_lot_dark (lot_no_dark) in the substantially current video frame's value-saturation 2D-histogram is calculated as new dark-gain (new_K_dark) and averaged with prev_K_dark to calculate val_K_dark_c of the substantially current or next video frame in step 955.

Further, if it is determined that prev_lot_no_dark is mid-tone (i.e., 6) in step 915, then a check is made to determine whether lot_no_dark is 0 or 1 or 2 in step 960. If it is determined that lot_no_dark is not 0 or 1 or 2 (i.e., lot_no_dark is mid-tone), then it is to be implied that change in the substantially current video frame characteristics, compared to the substantially previous video frame characteristics is very small, and hence, no value dark-gain is to be applied on the substantially current or next video frame as it is in mid-tone-region. However, carry-forward-dark-gain (if any, of the substantially previous video frame) cannot be made zero abruptly in the substantially current video frame, as it may result in flicker. Hence, val_K_dark_c is calculated as in step 930. If the check done in step 960 is true, it is to be implied that the pixels have moved from mid-tone-region to dark-region and thus step 965 is performed.

In step 965, a condition check is done to determine whether bright lot number of maximum pixel count of the substantially previous video frame (prev_lot_no_bright) is not equal to mid-tone (i.e., 6) and bright lot number of maximum pixel count of the substantially current video frame (lot_no_bright) is equal to mid-tone (i.e., 6), to identify the region from where the pixels have moved to dark-region. The lot_no_bright and prev_lot_no_bright calculation is as per step 1010 of FIG. 10. If the condition check done in step 965 is true, it is to be implied that pixels have moved from bright-region to dark-region, which is considered to be a large change in the substantially current video frame characteristics compared to the substantially previous video frame characteristics (i.e., fast moving video frame sequence). Hence, val_K_dark_c is calculated as in step 945.

If the condition check done in step 965 is false, it is to be implied that the pixels have moved from mid-tone-region to dark-region, which is considered to be a small change in the substantially current video frame characteristics compared to the substantially previous video frame characteristics. Hence, val_K_dark_c is calculated as in step 955.

Figure 10:
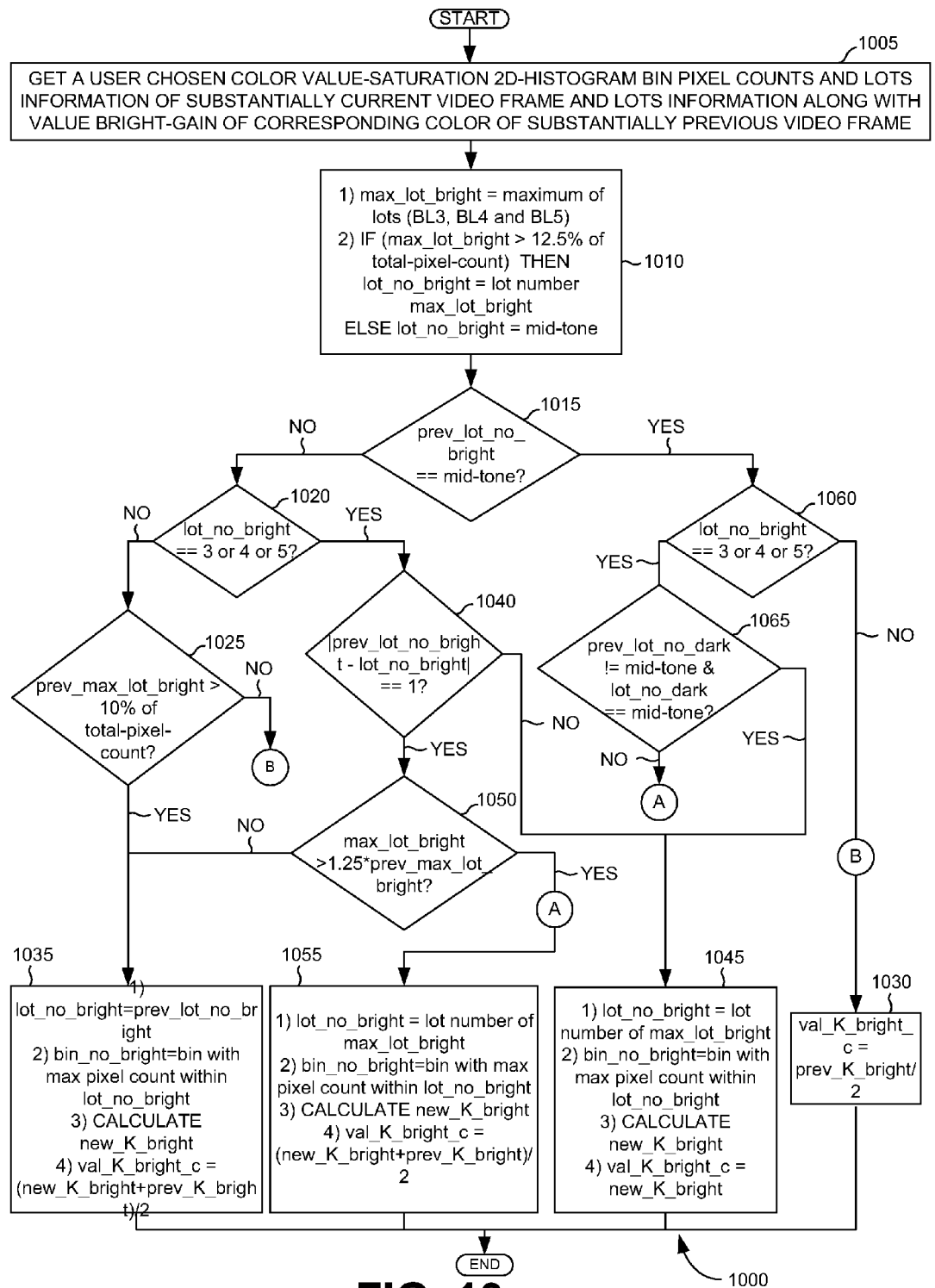
FIG. 10 is a flowchart illustrating dynamic calculation of saturation dependant value bright-gain, adaptive to slow or fast moving image sequences, for a user chosen color of a substantially current video frame, according to an embodiment.

FIG. 10 is a flowchart 1000 illustrating dynamic calculation of saturation dependant value bright-gain, adaptive to slow or fast moving image sequences, for a user chosen color of a substantially current video frame, according to an embodiment. The changes in bin pixel concentration of a value-saturation 2D-histogram of the substantially current video frame compared to that of a substantially previous video frame along with a saturation dependant value bright-gain of the substantially previous video frame are considered for dynamically calculating a saturation dependant value bright-gain, adaptive to slow or fast moving image sequences, of the substantially current or next video frame. In one embodiment, if substantially previous and current video frame value-saturation 2D-histogram lots with maximum pixel count are adjacent to each other (e.g., slow moving video frame sequence), then the amount of value bright-gain to be applied on the substantially current or next video frame depends on the substantially current video frame and the saturation dependant value bright-gain of the substantially previous video frame.

In another embodiment, if the value-saturation 2D-histogram lots with maximum pixel count of the substantially current and previous video frames are not adjacent to each other (e.g., fast moving video frame sequences), then the amount of value bright-gain to be applied on the substantially current or next video frame depends only on the substantially current video frame and does not depend on the saturation dependant value bright-gain of the substantially previous video frame. This method of saturation dependant value bright-gain dynamic calculation ensures that the saturation dependant value bright-gain applied on the consecutive video frames are adaptive to slow or fast moving image sequences and thereby avoids flicker.

In step 1005, value-saturation 2D-histogram bin pixel counts and lots information of the substantially current video frame for a user chosen color and lots information along with saturation dependent value bright-gain of corresponding color of substantially previous video frame are obtained. In step 1010, a lot with maximum pixel count (max_lot_bright) is found among the lots BL3, BL4 and BL5 of the value-saturation 2D-histogram for the user chosen color of the substantially current video frame. If the max_lot_bright has pixel count greater than the predetermined threshold (e.g., 12.5% of total-pixel-count), it is to be implied that majority of the pixel concentration lies in that lot, then the lot number (3 or 4 or 5) of max_lot_bright is assigned to lot_no_bright. If not, lot number of the mid-tone lot (i.e., 6 for ML6) is assigned to lot_no_bright.

In step 1015, a condition check is done to determine whether the bright lot number of maximum pixel count of the substantially previous video frame (prev_lot_no_bright) is mid-tone (i.e., 6) or not. If prev_lot_no_bright is not a mid-tone, then a check is done to determine whether lot_no_bright is 3 or 4 or 5 in step 1020. If the check done in step 1020 is false, it is to be implied that lot_no_bright is mid-tone and to quantify the amount of value bright-gain to be applied, a condition check is done in step 1025 to determine whether prev_max_lot_bright is having a pixel count greater than a predetermined threshold (e.g., 10% of total-pixel-count) in the substantially current video frame's value-saturation 2D-histogram.

If the check done in step 1025 is false, then it is to be implied that majority of pixels have moved from bright-region of the substantially previous video frame to mid-tone-region of the substantially current video frame, and hence, no value bright-gain is to be applied to the substantially current or next video frame as it is in mid-tone-region.

However, during transition from bright-region to mid-tone-region video frame sequences, the value bright-gain cannot be made zero abruptly, as it may result in flicker, so the value bright-gain applied to the substantially previous video frame (prev_val_K_bright) is halved and applied as the saturation dependant value bright-gain (val_K_bright_c) for the substantially current or next video frame in step 1030, which gradually tends to zero in subsequent mid-tone frames if any, there-by avoiding flicker. This saturation dependant value bright-gain applied on the substantially current or next video frame during said transition from bright-region to mid-tone-region video frame sequence is also termed as "carry-forward-bright-gain".

Alternatively, if the check done in step 1025 is true, it is to be implied that considerable amount of pixels are lying in the bright-region and hence gain corresponding to the bin with maximum pixel count (bin_no_bright) within the bins of the lot number of prev_max_lot_bright (prev_lot_no_bright) in the substantially current video frame's value-saturation 2D-histogram is calculated as new bright-gain (new_K_bright) and averaged with the saturation dependant value bright-gain of the substantially previous video frame (prev_K_bright) to calculate a saturation dependant value bright-gain (val_K_bright_c) of the substantially current or next video frame in step 1035.

Further, if the check done in step 1020 is true, then step 1040 is performed to identify the nature of pixel movement. In step 1040, an adjacency condition check is done in which, a substantially previous video frame lot is said to be adjacent to a substantially current video frame lot, if and only if |prev_lot_no_bright−lot_no_bright|=1. If the adjacency check is false in step 1040, it is to be implied that the pixels have moved either from BL3 to BL5 or vice-versa, which is considered to be a sudden change in the substantially current video frame characteristics compared to the substantially previous video frame characteristics. Hence, gain corresponding to the bin with maximum pixel count (bin_no_bright) within the bins of the lot number of max_lot_bright (lot_no_bright) in the substantially current video frame's value-saturation 2D-histogram is calculated as new bright-gain (new_K_bright) and assigned as val_K_bright_c of the substantially current or next video frame in step 1045.

If the adjacency check done in step 1040 is true, it is to be implied that the pixels have moved either between BL3 and BL4 or BL4 and BL5, which is considered to be a small change in the substantially current video frame characteristics compared to the substantially previous video frame characteristics. Thus, if adjacency condition check is true, then step 1050 is performed to further quantify the amount of pixel movement. In step 1050, a condition check is done to determine whether max_lot_bright is greater than prev_max_lot_bright by a predefined threshold (e.g., 25%).

If the check done in step 1050 is false, it is to be implied that considerable number of pixels have not moved into lot_no_bright from prev_lot_no_bright, which is considered to be a small change. Hence, val_K_bright_c is calculated as in step 1035. If the condition check done in step 1050 is true, it is to be implied that a considerable number of pixels have moved into lot_no_bright from prev_lot_no_bright, but still considered to be a small change, as it satisfied the adjacency condition in step 1040. And hence, gain corresponding to the bin with maximum pixel count (bin_no_bright) within the bins of the lot number of max_lot_bright (lot_no_bright) in the substantially current video frame's value-saturation 2D-histogram is calculated as new bright-gain (new_K_bright) and averaged with prev_K_bright to calculate val_K_bright_c of the substantially current or next video frame in step 1055.

Further, if it is determined that prev_lot_no_bright is mid-tone (i.e., 6) in step 1015, then a check is made to determine whether lot_no_bright is 3 or 4 or 5 in step 1060. If it is determined that lot_no_bright is not 3 or 4 or 5 (i.e., lot_no_bright is mid-tone), then it is to be implied that the change in the substantially current video frame characteristics compared to the substantially previous video frame characteristics is very small and hence, no value bright-gain is to be applied on the substantially current or next video frame as it is in mid-tone-region. However, carry-forward-bright-gain (if any, of the substantially previous video frame) cannot be made zero abruptly in the substantially current video frame, as it may result in flicker. Hence, val_K_bright_c is calculated as in step 1030. If the check made in step 1060 is true, it is to be implied that the pixels have moved from mid-tone-region to bright-region and moves on to step 1065.

In step 1065, a condition check is done to determine whether dark lot number of maximum pixel count of the substantially previous video frame (prev_lot_no_dark) is not equal to mid-tone (i.e., 6) and dark lot number of maximum pixel count of the substantially current video frame (lot_no_dark) is equal to mid-tone (i.e., 6), to identify the region from where the pixels have moved to bright-region. The lot_no_dark and prev_lot_no_dark calculation is as per step 910 of FIG. 9. If the condition in step 1065 is true, it is to be implied that pixels have moved from dark-region to bright-region, which is considered to be a large change in the substantially current video frame characteristics compared to the substantially previous video frame characteristics (i.e., fast moving video frame sequence). Hence, val_K_bright_c is calculated as in step 1045.

If check done in step 1065 is false, it is to be implied that the pixels have moved from mid-tone-region to bright-region, which is considered to be a small change in the substantially current video frame characteristics compared to the substantially previous video frame characteristics. Hence, val_K_bright_c is calculated as in step 1055.

The new dark-gain (new_K_dark) and the new bright-gain (new_K_bright) of the substantially current video frame referred in various steps of FIG. 9 and FIG. 10 respectively are calculated using bin_no_dark and bin_no_bright of the corresponding step by using FIG. 11 example table.

FIG. 11 is an example table 1100 showing the predefined new dark-gain and new bright-gain (new_K_dark and new_K_bright) which are used in the saturation dependant value dark-gain and value bright-gain dynamic calculation of FIG. 9 and FIG. 10 respectively, associated with the value-saturation 2D-histogram bins (bin_no_dark and bin_no_bright) shown in FIG. 5. Particularly, the table 1100 illustrates the predefined new dark-gain (new_K_dark) and new bright-gain (new_K_bright), corresponding to the value-saturation bin number (bin_no_dark and bin_no_bright), along with their respective saturation and value ranges. It should be noted that the amount of new dark-gain and new bright-gain applied to a particular video frame depends upon the value-saturation 2D-histogram bins (bin_no_dark and bin_no_bright). Further, the new dark-gain and new bright-gain for the value-saturation 2D-histogram bins, illustrated in table 1100, are predefined in such a way that flicker does not appear in slow or fast moving image sequences. In one example implementation, for user chosen non-skin-tone colors, the value of Th1=0.375, Th2=0.6875 and Th3=1.0, and for user chosen skin-tone color, the value of Th1=0.2, Th2=0.4 and Th3=0.6.

Figure 12:
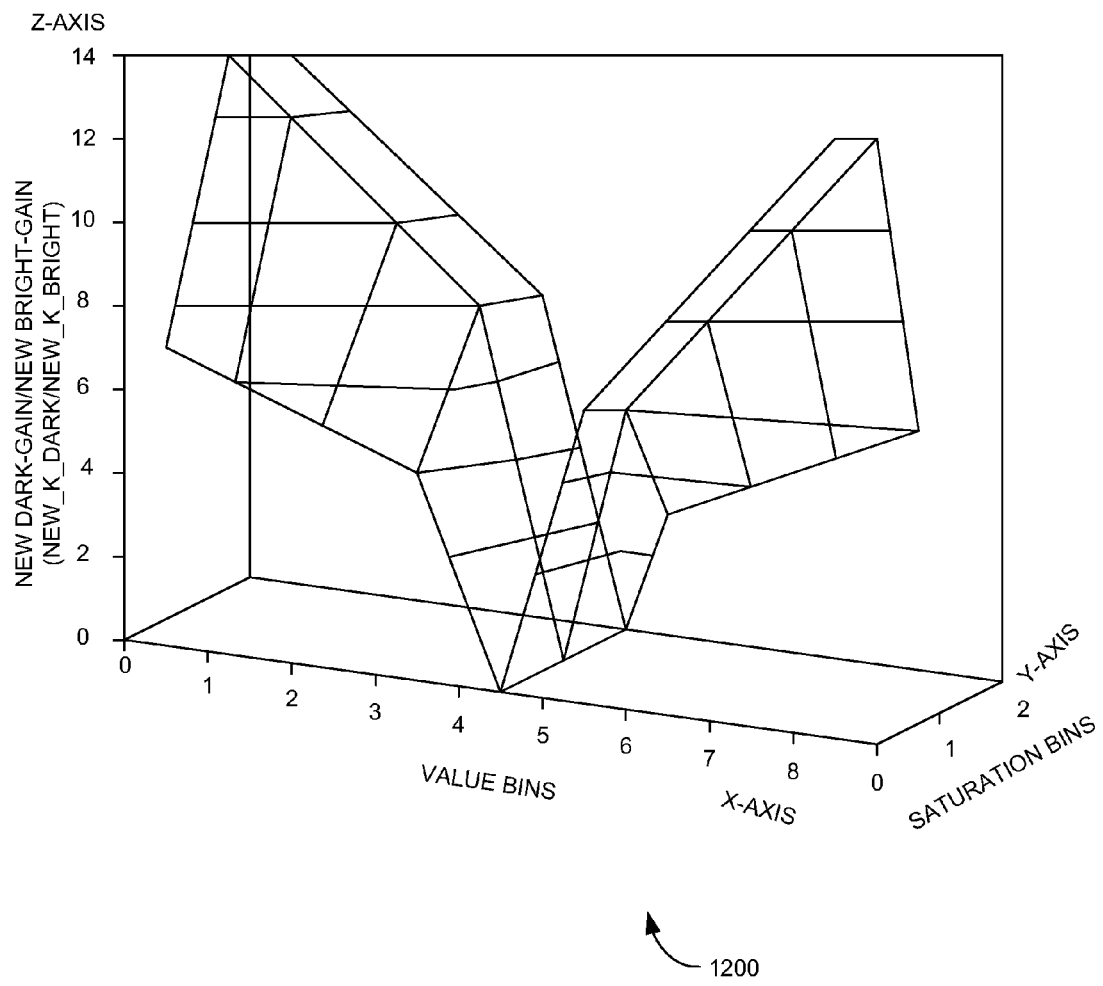
FIG. 12 is an example graph illustrating the predefined new dark-gain and new bright-gain which are used in the saturation dependant value dark-gain and value bright-gain dynamic calculation of FIG. 9 and FIG. 10 respectively, associated with the value-saturation 2D-histogram bins shown in FIGS. 5 and 11.

FIG. 12 is an example graph 1200 illustrating the predefined new dark-gain and new bright-gain which are used in the saturation dependant value dark-gain and value bright-gain dynamic calculation of FIG. 9 and FIG. 10 respectively, associated with the value-saturation 2D-histogram bins shown in FIGS. 5 and 11. Particularly, the graph 1200 shows a three-dimensional graphical distribution (X-axis as value bins axis, Y-axis as saturation bins axis and Z-axis as new dark-gain or new bright-gain) of the predefined new dark-gain and new bright-gain based on the value bins and saturation bins associated with the value-saturation 2D-histogram (e.g., the value-saturation 2D-histogram 500 shown in FIG. 5).

In the example embodiment illustrated in FIG. 12, the distribution of bin dependent new dark-gain and new bright-gain is described as: In case of lot DL0, both saturation and value components are low and the pixels in this region are very dark or grey colored, which generally represent shadow regions of a video frame. Hence, low new dark-gain is predefined in this region, whereas, in case of lots DL1 and DL2, saturation component is medium or high. However, as the value component is low, the desired change in saturation does not show up. Hence higher new dark-gain is predefined in these regions to increase the value component, which may lead to better visibility of the saturation changes applied on the substantially current video frame.

Similarly, in case of lots BL3 and BL4, the saturation component is low or medium but as the value component is high, the desired change in saturation does not show up. Hence, higher new bright-gain is predefined in these regions to reduce the value component, which may lead to better visibility of the saturation changes applied on the substantially current video frame. Further, in case of lot BL5, both saturation and value components are high and the pixels in this region correspond to very bright colors. Hence, low new bright-gain is predefined in this region.

Figure 13:
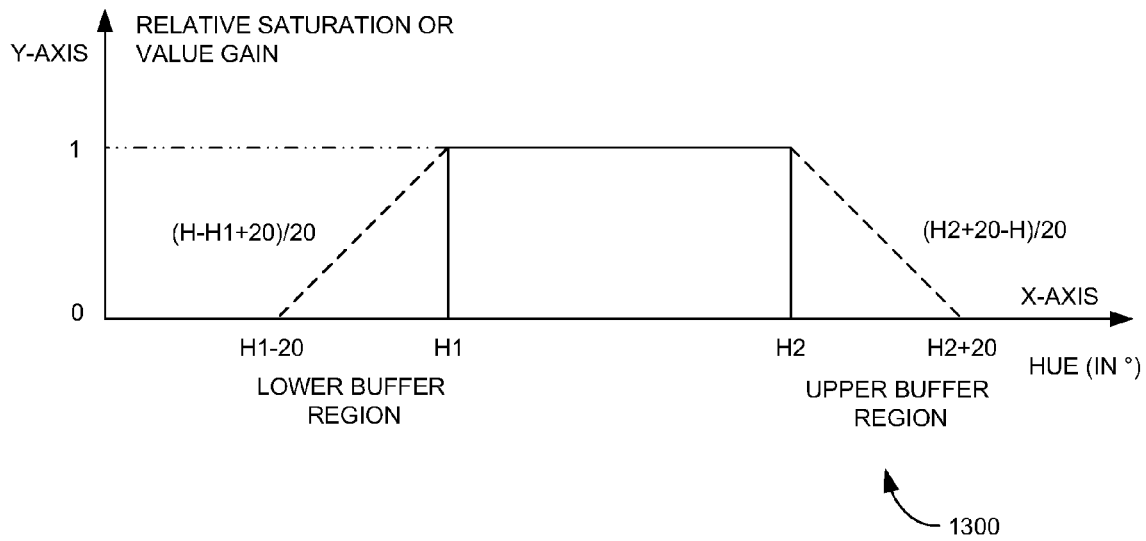
FIG. 13 is an example graph illustrating relative amount of calculated saturation and saturation dependant value gains to be applied to the saturation or value component in the Hue range of a user chosen color and its buffer regions.

FIG. 13 is an example graph 1300 illustrating relative amount of calculated saturation and saturation dependant value gains to be applied to saturation or value component in the Hue range of a user chosen color and its buffer regions. Particularly, FIG. 13 illustrates the user chosen color Hue range H1 to H2 (in ° of angle) with buffer regions, represented along the X-axis and relative saturation gain or saturation dependant value gains, represented along the Y-axis.

In some embodiments, additional Hue angle from the actual Hue angle of the user chosen color is considered as buffer region. In this example embodiment, the buffer region is ±20° from the actual Hue angle of the user chosen color. Also, as illustrated in FIG. 13, the lower buffer region (H1−20 to H1) is obtained by subtracting 20° from the minimum Hue H1 and the upper buffer region (H2 to H2+20) is obtained by adding 20° to the maximum Hue H2. Further, the lower buffer region (H1−20 to H1) and the upper buffer region (H2 to H2+20) are considered while comparing Hue components of the pixels for applying saturation and saturation dependant value gains.

In some embodiments, the relative amount of gain is applied on the saturation or value components in the Hue ranges (H1 to H2) of the user chosen color and the lower and upper buffer regions (i.e., (H1−20 to H1) and (H2 to H2+20) respectively) to avoid artifacts that may arise due to sudden change in the gain applied in the Hue range H1 to H2. It can be seen from FIG. 13 that the relative saturation or saturation dependent value gain to be applied is 1 in the user chosen color Hue range (H1 to H2), (H−H1+20)/20 in the lower buffer region (H1−20 to H1) and (H2+20−H)/20 in the upper buffer region (H2 to H2+20). In this example, H is Hue value between H1−20 to H1 or H2 to H2+20 for said lower and upper buffer regions respectively.

Figure 14:
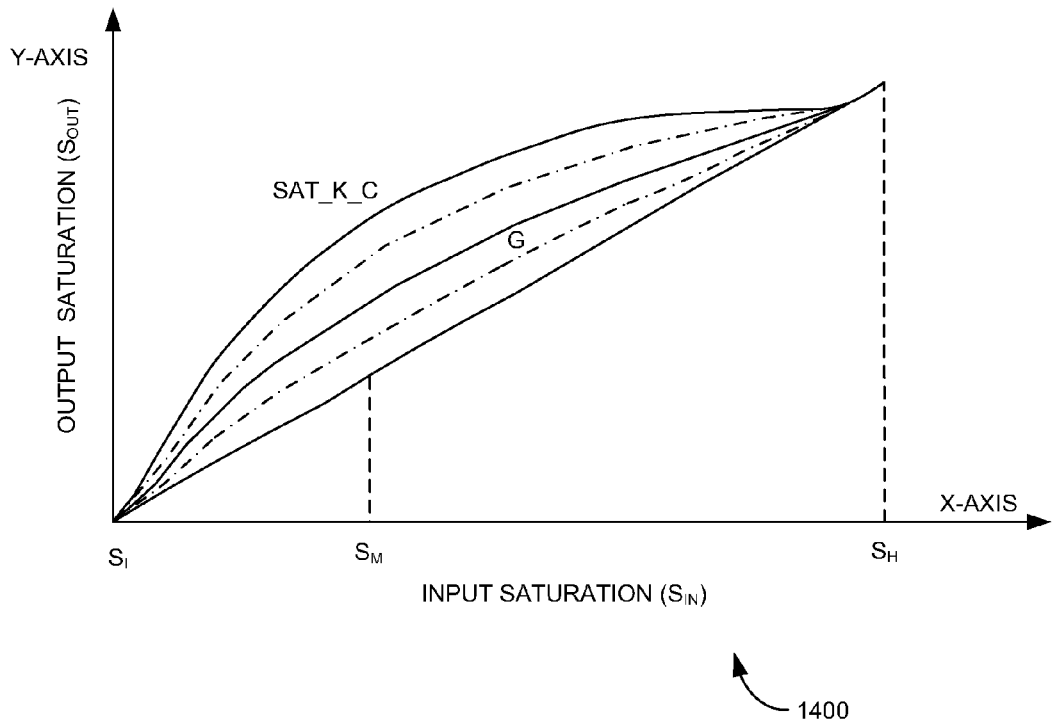
FIG. 14 is a graph showing non-linear saturation enhancement transfer characteristics curves with a computed saturation gain and varying user gains for a user chosen color, according to an embodiment.

FIG. 14 is a graph 1400 showing non-linear saturation enhancement transfer characteristics curves with a computed saturation gain and varying user gains for a user chosen color, according to an embodiment. FIG. 14 shows non-linear saturation enhancement transfer characteristics curves with various user gain scenarios for a dynamically calculated saturation gain (sat_K_c) of the user chosen color. The graph 1400 represents input saturation ($S_{in}$) along the X-axis and output saturation ($S_{out}$) along the Y-axis.

In one embodiment, the saturation component of incoming pixels is subjected to non-linear saturation enhancement transfer characteristics curve correction for enhancement of the user chosen color. It can be noted that the non-linear saturation enhancement transfer characteristics curve may change dynamically frame-by-frame as per the dynamically computed saturation gain, adaptive to slow or fast moving image sequences, with the saturation 1D-histogram (as shown in FIGS. 3 and 4) extracted for a substantially current video frame for the user chosen color. Further, in one embodiment, it is determined that, which one of the dynamically computed saturation gains (sat_K_c) associated with each user chosen color or no gain is to be applied as a saturation gain (sat_K) on a per-pixel basis in the substantially current or next video frame.

Further, the saturation enhancement correction on the per-pixel basis for various user chosen colors is based on the following equation:

$$S_{out}=S_{in}+\{G*[(sat\_K*(\text{Exp}(-(S_{in}-S_m)^2/((S_h-S_{in})*(S_{in}-S_l)))))-\text{Offset}]*\text{Buff}\}$$

where, $S_{in}$ refers to saturation component of the input pixel, sat_K refers to determined saturation gain, G refers to a user gain, Buff refers to Hue buffer region correction=1 for H1≦H≦H2, (H1−H+20)/20 for H1−20<H<H1 and (H2+20−H)/20 for H2<H<H2+20, Offset refers to offset added for adjusting the saturation enhancement equation to provide desired correction in case of saturation diminution, $S_m$ refers to a saturation point, where peak gain is applied, $S_l$ refers to minimum saturation point considered for correction, $S_h$ refers to maximum saturation point considered for correction, Exp( ) refers to exponential function, and $S_{out}$ refers to enhanced saturation component output.

It can be noted that the user gain (G) is a user-defined parameter, which defines the relative amount of dynamically computed saturation gains (sat_K) to be applied for the user chosen color on the substantially current video frame. It can take any value in the range −1 to 1 in steps of 0.03125, whereas positive and negative gains indicate color enhancement and diminution choice respectively.

For example, for user chosen non-skin-tone color (e.g., vegetation, sky-sea and the like) enhancement, $S_m=(S_h-S_l)/3$, $S_l=0$, $S_h=1$, Offset=0, sat_K=determined saturation gain and G=user gain ranging from 0 to 1. In addition, for skin-tone saturation enhancement, $S_m=(S_h+S_l)/2$, $S_l=0$, $S_h=0.6$, offset=0, sat_K=determined saturation gain, and G=user gain ranging from 0 to 1.

Figure 15:
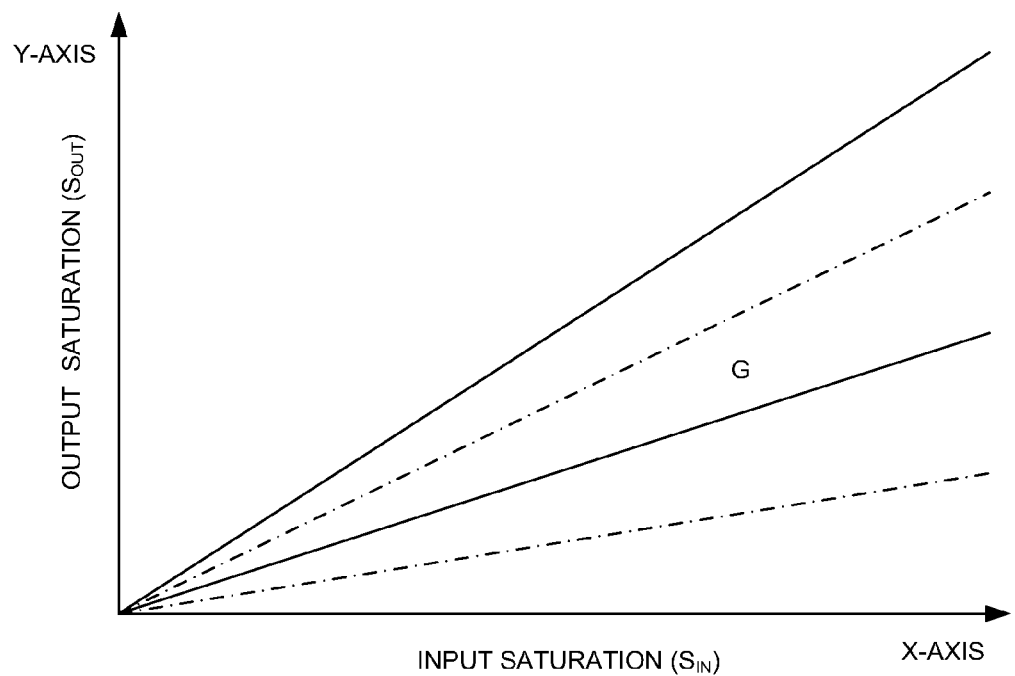
FIG. 15 is a graph showing saturation diminution transfer characteristics curves with varying user gains for a user chosen color, according to an embodiment.

FIG. 15 is a graph 1500 showing saturation diminution transfer characteristics curves with varying user gains for a user chosen color, according to an embodiment. Particularly, the graph 1500 shows saturation diminution for various values of user gains (G) of the user chosen color. The graph 1500 represents input saturation ($S_{in}$) along the X-axis and output saturation ($S_{out}$) along the Y-axis. In saturation diminution, the user chosen color is to be reduced on a per-pixel basis in a substantially current video frame by an amount equivalent to the gain specified by the user. It can be noted that the user gain (G) is negative and lies between −1 to 0 in case of saturation diminution. Further, the saturation diminution correction on the per-pixel basis for various user chosen colors is based on the following equation:

$$S_{out}=(1+G)*S_{in}$$

It should be noted that by adjusting various variables such as $S_m$, $S_l$, $S_h$, sat_K and offset in the saturation enhancement equation, a close approximation can be achieved for the saturation diminution correction equation. For example, values of different variables for approximation of the saturation enhancement correction equation to the saturation diminution correction equation for both user chosen non-skin-tone and skin-tone colors is given as follows: for non-skin-tone color saturation diminution, $S_m=1.5$, $S_l=-0.7$, $S_h=1.6$, offset=0.20703125, sat_K=1.5, and G=negative value ranging from −1 to 0, and for skin-tone color saturation diminution, $S_m$-0.5, $S_l$=0.0, $S_h$=0.8, offset=0, sat_K=0.375 and G=negative value ranging from −1 to 0.

Figure 16:
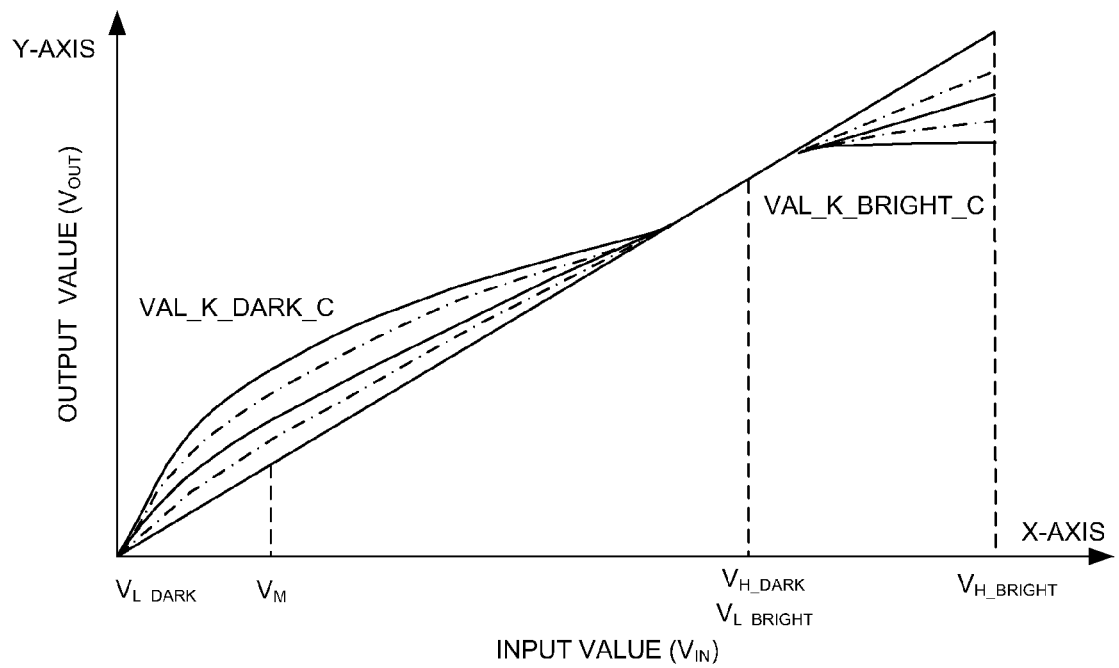
FIG. 16 is a graph showing non-linear value correction transfer characteristics curves with varying saturation dependant value dark-gain and value bright-gain for a user chosen color, according to an embodiment.

FIG. 16 is a graph 1600 showing non-linear value correction transfer characteristics curves with varying saturation dependant value dark-gain and value bright-gain for a user chosen color, according to an embodiment. The graph 1600 represents input value ($V_{in}$) along the X-axis and output value ($V_{out}$) along the Y-axis. In one embodiment, value component of incoming pixels is subjected to a non-linear value transfer characteristics curve correction (as shown in FIG. 16) for enhancement of the user chosen color. The graph 1600 shows the non-linear value correction transfer characteristics curves with various user gain scenarios for dynamically computed saturation dependent value dark-gain and value bright-gain (val_K_dark_c/val_K_bright_c) for the user chosen color. Further, in one embodiment, it is determined that, which one of the dynamically computed saturation dependent value gains (val_K_dark_c and val_K_bright_c) associated with each user chosen color or no gain is to be applied as a saturation dependant value gain (e.g., val_K_dark/val_K_bright) on a per-pixel basis in the substantially current or next video frame.

The value correction non-linear transfer characteristic curves may change frame-by-frame as per the dynamically computed saturation dependent value dark-gain and value bright-gain, adaptive to slow or fast moving image sequences, with value-saturation 2D-histogram as shown in FIG. 5, extracted for the substantially current video frame.

In one embodiment, for pixels having value component less than (3*(full scale value range))/4, value dark-gain is applied. The value component correction, based on the value dark-gain, on the per-pixel basis for various user chosen colors, is based on the following equation:

$$V_{out}=V_{in}+\{val\_K\_dark*Exp[-(V_{in}-V_m)^2/((V_{h\_dark}-V_{in})*(V_{in}-V_{l\_dark}))]*Buff\},$$

for $0 \leq V_{in} \leq (3*(\text{full scale value range}))/4$ where $V_{in}$ refers to value component of the input pixel, val_K_dark refers to determined value dark-gain, $V_m$ refers to the value point, where peak gain is applied, $V_{l\_dark}$ refers to minimum value point, considered for applying value dark-gain, which is 0, $V_{h\_dark}$ refers to maximum value point, considered for applying value dark-gain, which is (3*(full scale value range))/4, Buff refers to Hue buffer region correction=1 for H1≦H≦H2, (H1−H+20)/20 for H1−20<H<H1 and (H2+20−H)/20 for H2<H<H2+20, Exp( ) refers to exponential function, and $V_{out}$ refers to enhanced value component output.

In another embodiment, for the pixel having value component greater than (3*(full scale value range))/4, value bright-gain is applied. The value component correction, based on value bright-gain, on the per-pixel basis for various user chosen colors is based on the following equation:

$$V_{out}=V_{in}-\{val\_K\_bright*Exp[-(V_{h\_bright}-V_{in})/(V_{in}V_{l\_bright})]*Buff\},$$

for $(3*(\text{full scale value range}))/4 < V_{in} \leq (\text{full scale value range})$ where, $V_{in}$ refers to value component of the input pixel, val_K_bright refers to determined value bright-gain, $V_{l\_bright}$ refers to minimum value point, considered for applying value bright-gain, which is (3*(full scale value range))/4, $V_{h\_bright}$ refers to maximum value point, considered for applying value bright-gain, which is (full scale value range), Buff refers to Hue buffer region correction=1 for H1≦H≦H2, (H1−H+20)/20 for H1−20<H<H1 and (H2+20−H)/20 for H2<H<H2+20, Exp( ) refers to exponential function, $V_{out}$ refers to enhanced value component output.

From the above equations, it can be noted that the value component correction does not depend on a user gain (G). Also, it can be noted that in case the user chooses color diminution, value component correction is not applicable.

Figure 17:
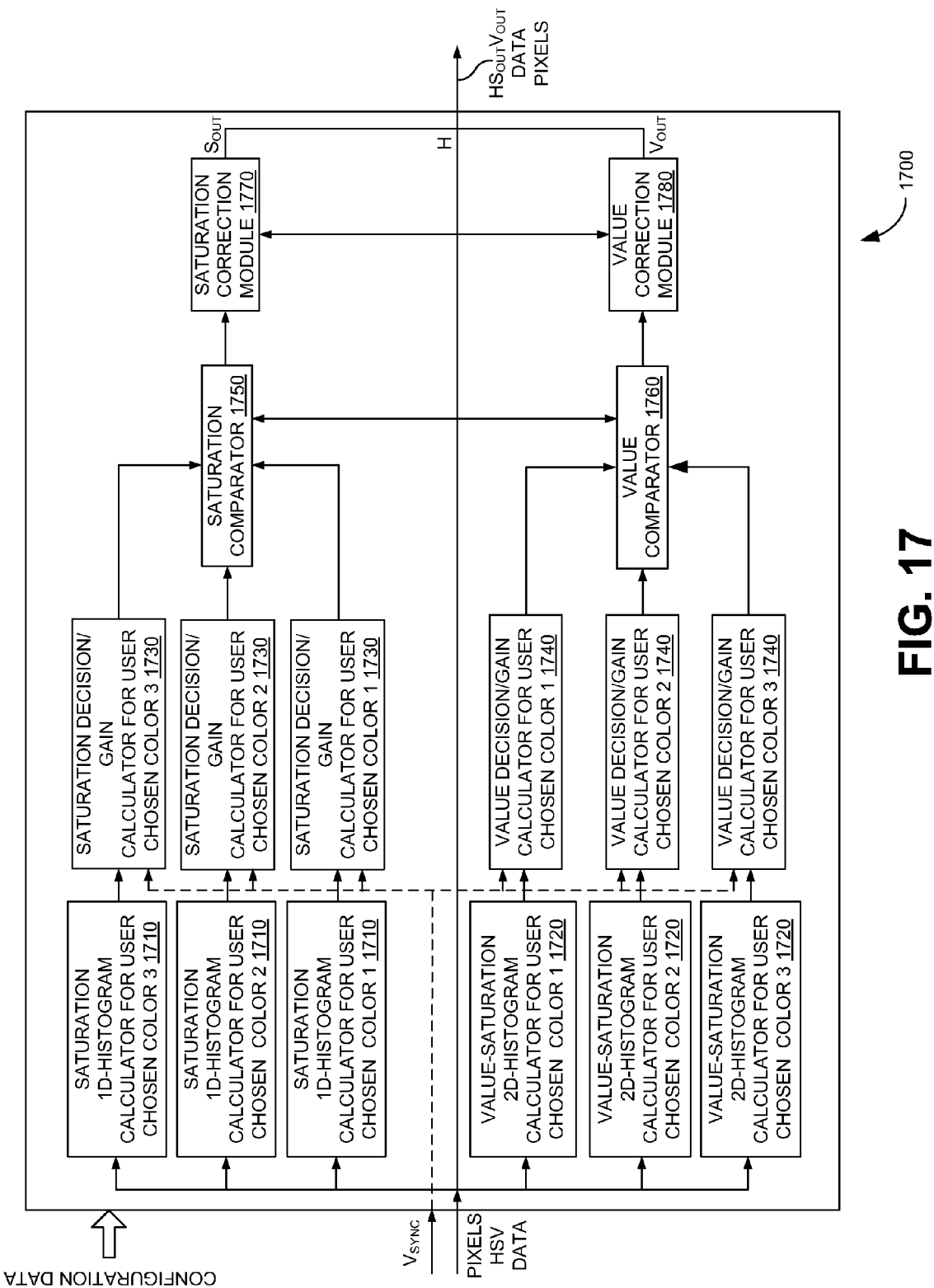
FIG. 17 is a top-level block diagram illustrating an image processing apparatus used for dynamic and adaptive enhancement and/or diminution, with concurrent enhancement of any number of user chosen colors, diminution of any number of user chosen colors, or any combination thereof, on a frame-by-frame basis to an incoming digital video signal, according to an embodiment.

FIG. 17 is a top-level block diagram 1700 illustrating an image processing apparatus used for dynamic and adaptive enhancement and/or diminution, with concurrent enhancement of any number of user chosen colors, diminution of any number of user chosen colors, or any combination thereof, on a frame-by-frame basis to an incoming digital video signal, according to an embodiment. Particularly, FIG. 17 illustrates a per user chosen color saturation 1D-histogram calculator 1710, a per user chosen color value-saturation 2D-histogram calculator 1720, a per user chosen color saturation decision/gain calculator 1730 coupled to the corresponding color saturation 1D-histogram calculator 1710, a per user chosen color value decision/gain calculator 1740 coupled to the corresponding color value-saturation 2D-histogram calculator 1720, a saturation comparator 1750 coupled to the saturation decision/gain calculators 1730, a value comparator 1760 coupled to the value decision/gain calculators 1740, a saturation correction module 1770 coupled to the saturation comparator 1750, and a value correction module 1780 coupled to the value comparator 1760.

It should be noted that three saturation 1D-histogram calculators, three value-saturation 2D-histogram calculators, three saturation decision/gain calculators and three value decision/gain calculators are shown for three different example user chosen colors; chosen color 1, chosen color 2 and chosen color 3 as an example. It should be also noted that single set of saturation decision/gain and value decision/gain calculators can be used to calculate saturation gain and saturation dependant value gains of various user chosen colors by iteratively using the said same calculators. This is because saturation gain and saturation dependant value gains are calculated once per frame during vertical blanking period (Vsync).

The saturation 1D-histogram calculator 1710 forms a saturation 1D-histogram for a user chosen color using a substantially current video frame. In some embodiments, the saturation decision/gain calculator 1730 dynamically computes a saturation gain, adaptive to slow or fast moving image sequences, for the user chosen color of the substantially current video frame using the corresponding color formed the saturation 1D-histogram of the substantially current video frame and corresponding color saturation 1D-histogram information and a saturation gain of a substantially previous video frame. For example, the substantially current video frame includes a plurality of pixels.

The value-saturation 2D-histogram calculator 1720 forms a value-saturation 2D-histogram (e.g., shown in FIG. 5) for a user chosen color using the substantially current video frame. Further, the value decision/gain calculator 1740 dynamically computes saturation dependent value gains (e.g., includes value dark-gain and value bright-gain), adaptive to slow or fast moving image sequences, for the user chosen color, using the corresponding color value-saturation 2D-histogram of the substantially current video frame, and corresponding color value-saturation 2D-histogram information and saturation dependent value gains of the substantially previous video frame.

The saturation comparator 1750 determines which one of the dynamically computed saturation gains associated with each user chosen color or no gain is to be applied on a per-pixel basis by comparing Hue, saturation and value components (HSV) of each pixel with predefined HSV ranges of various user chosen colors respectively. Further, the value comparator 1760 determines which one of the dynamically computed saturation dependent value gains associated with each user chosen color or no gain is to be applied on a per-pixel basis by comparing Hue, saturation and value (HSV) of each pixel with predefined HSV ranges of various user chosen colors respectively. In these embodiments, the saturation correction module 1770 applies the determined saturation gain on the per-pixel basis in the substantially current or next video frame and the value correction module 1780 applies the determined saturation dependent value gain on the per-pixel basis in the substantially current or next video frame.

In operation, the saturation 1D-histogram calculator 1710 of a user chosen color receives input data pixels of a substantially current video frame in HSV format. In one embodiment, each video frame in a digital input video signal includes m*n pixels ("m" pixels per line with "n" lines per video frame). The input data pixels are grouped into different bins of the saturation 1D-histogram, depending upon the Hue, saturation and value components of each pixel. For example, for user chosen non-skin-tone colors, if the pixel lies in the predefined Hue range, then depending upon the saturation and value components of the pixel, the pixel is placed into one of the predefined 16-bins of the corresponding color saturation 1D-histogram. For user chosen skin-tone color, the pixels satisfying predefined Hue, saturation and value ranges are placed into one of the predefined 6-bins of the skin-tone saturation 1D-histogram. Similarly, the user chosen color value-saturation 2D-histogram calculator 1720 receives input data pixels in HSV format. The input data pixels are grouped into predefined 24-bins of the user chosen color value-saturation 2D-histogram depending upon the Hue, saturation and value component of each pixel.

Further, a user chosen color's saturation decision/gain calculator 1730 dynamically computes a saturation gain (sat_K_c) of the corresponding color, adaptive to slow or fast moving image sequences, depending upon the corresponding color histogram bins pixel count of the substantially current video frame, received from the saturation 1D-histogram calculator 1710 along with the characteristics of the substantially previous video frame, during vertical blanking period (Vsync). Similarly, the value decision/gain calculator 1740 dynamically computes a value dark-gain (val_K_dark_c) and a value bright-gain (val_K_bright_c), adaptive to slow or fast moving image sequences, of the user chosen color depending upon the corresponding color histogram bins pixel count of the substantially current video frame received from the value-saturation 2D-histogram calculator 1720 along with the characteristics of the substantially previous video frame, during vertical blanking period ($V_{sync}$).

The saturation comparator 1750 coupled to the saturation decision/gain calculators 1730 of the user chosen colors, compares the Hue, saturation and value components of each pixel in the substantially current or next video frame to the predefined HSV ranges (e.g., mentioned in the table 200) of various user chosen colors, including a buffer region for Hue and determines appropriate saturation gain to be applied on a per-pixel basis to the saturation correction module 1770. Similarly, the value comparator 1760 coupled to the value decision/gain calculators 1740 of the user chosen colors, compares the Hue, saturation and value components of each pixel in the substantially current or next video frame to the predefined HSV ranges (e.g., mentioned in table 200) of various user chosen colors, including a buffer region for Hue and determines appropriate value dark-gain or value bright-gain to be applied on the per-pixel basis to the value correction module 1780.

The saturation correction module 1770 then applies the computed per-pixel saturation gain as a function of the comparison, on the saturation component with non-linear transfer characteristics curve correction in the substantially current or next video frame. In parallel, the value correction module 1780 applies the determined per-pixel value dark-gain or value bright-gain as a function of the comparison, on the value component with non-linear transfer characteristics curve correction in the substantially current or next video frame.

In some embodiments, the saturation decision/gain calculators 1730 and the value decision/gain calculators 1740 receive vertical sync ($V_{sync}$) information as input. In addition, as shown in FIG. 17, the image processing apparatus 1700 receives configuration data, such as user chosen colors, corresponding user chosen color's user gain (G), value dark-gain, value bright-gain and saturation gain. It should be noted that the configuration of value dark-gain, value bright-gain and saturation-gain parameters are optional and only needed if manual control is desired. In these embodiments, the image processing apparatus 1700 outputs color enhanced pixels data as per configured parameters.

It can be noted that the image processing apparatus 1700 can be applied to any bit representations of the predefined HSV components such as 8/10/12 bits and others. Further, the image processing apparatus 1700 includes a memory for storing information associated with each user chosen color saturation 1D-histogram and value-saturation 2D-histogram and for storing the dynamically computed saturation gain and value dark-gain and value bright-gain of the substantially current video frame.

Figure 18:
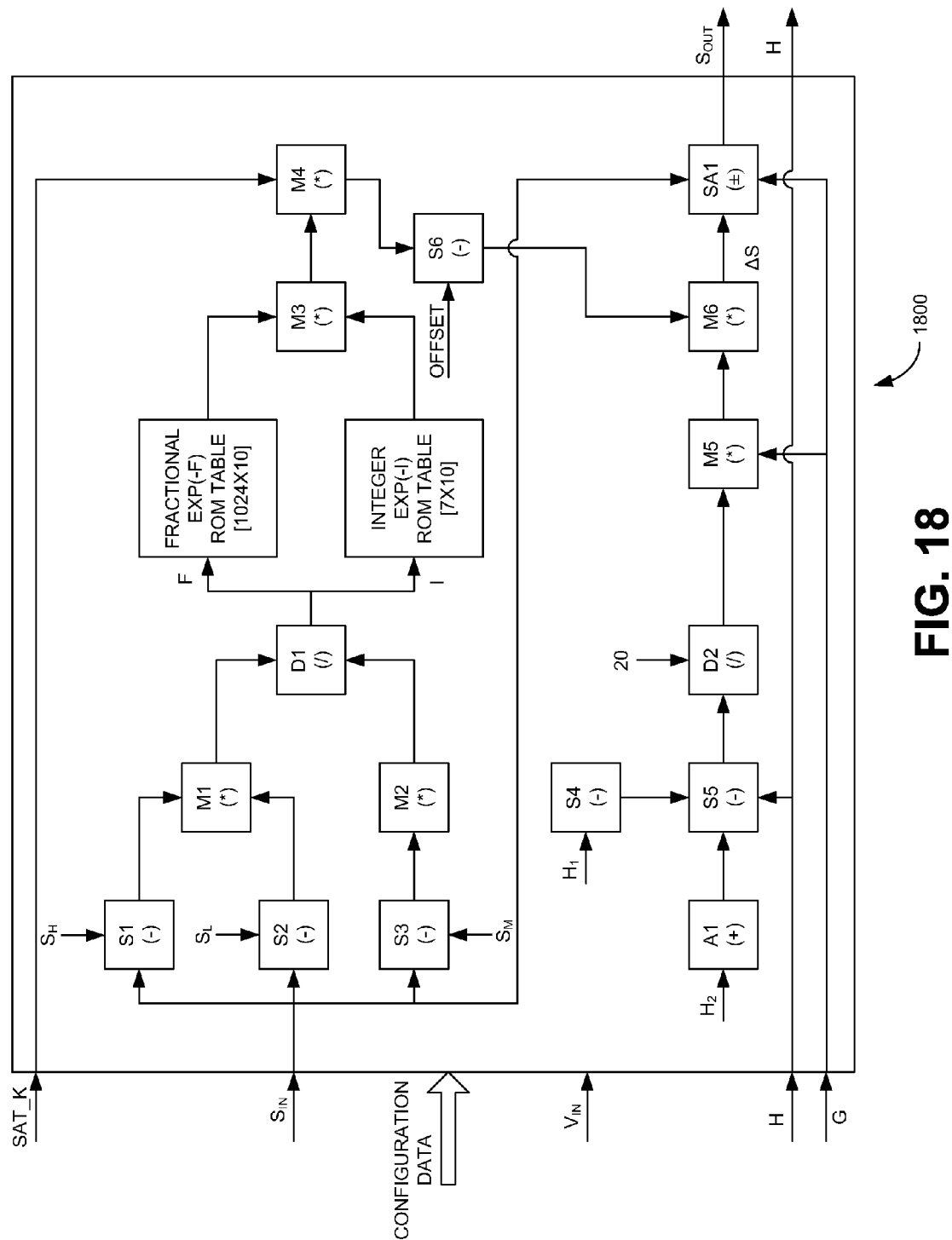
FIG. 18 is an example block diagram of the saturation correction module shown in FIG. 17, according to one embodiment.

FIG. 18 is an example block diagram 1800 of the saturation correction module 1770 shown in FIG. 17, according to one embodiment. Particularly, FIG. 18 illustrates multipliers M1-M6, an adder A1, subtractors S1-S6, an adder/subtractor SA1, dividers D1 and D2, a 1024×10 fractional exponent (−F) ROM table and a 7×10 integer exponent (−I) ROM table.

In operation, the saturation correction module 1770 receives a user gain for each user chosen color to be applied to the substantially current video frame. The saturation correction module 1770 then applies a non-linear saturation enhancement transfer characteristics curve corrections on a per-pixel basis, based on the determined saturation gain of corresponding pixel and the received user gain in the substantially current or next video frame.

In the following description, 12-bit representation of the predefined HSV components is considered. The saturation correction module 1770 also gets per user chosen color, user gain (G) parameter as an input, which decides the fraction of the saturation gain calculated by the corresponding color saturation gain/decision calculator 1730 to be applied on the pixels of the corresponding user chosen color in the substantially current or next video frame. In some embodiments, the saturation correction module 1770 applies the non-linear saturation enhancement transfer characteristics curve correction using the following steps:

1) For every pixel, 13-bit subtractors S1, S2 and S3 calculate the values of $(S_h-S_{in})$, $(S_{in}-S_l)$ and $(S_{in}-S_m)$ respectively and gives 13-bit results. The values of $S_m$, $S_h$ and $S_l$ may vary depending upon the color of the incoming pixel 2) The 13-bit $(S_{in}-S_l)$ and $(S_h-S_{in})$ results are fed to a 13-bit multiplier M which gives out a 26-bit result of $[(S_{in}-S_l)*(S_h-S_{in})]$, truncated to 10-bit accuracy. In parallel, 13-bit ($S_{in}-S_m$) result is also fed to another 13-bit multiplier M2 which gives out a 26-bit result of ($S_{in}-S_m$)$^2$, truncated to 10-bit accuracy 3) [($S_{in}-S_l$)*($S_h-S_{in}$)] and ($S_{in}-S_m$)$^2$ resulting from M1 and M2 are fed to a 10-bit divider D1 which gives out a 20-bit result (10-bit integer (I) and 10-bit fraction(F)) of ($S_{in}-S_m$)$^2$/[($S_{in}-S_l$)*($S_h-S_{in}$)]

4) The 10-bit fractional result (F) is fed to [Exp(-F)] ROM table of size 1024×10 as address, which outputs a 10-bit result corresponding to Exp(fractional part(-($S_{in}-S_m$)$^2$/[($S_{in}-S_l$)*($S_h-S_{in}$)])). Since the ROM table size is 1024×10, the total size of the exponential ROM table is 1280 bytes. The 10-bit integer result (I) is fed to [Exp(-I)] ROM table of size 7×10 as address, which outputs a 10-bit result corresponding to Exp(integer part(-($S_{in}-S_m$)$^2$/[($S_{in}-S_l$)*($S_h-S_{in}$)])). Since the ROM table size is 7×10, the total size of the integer ROM table is 9 bytes.

5) The 10-bit Exp(-F) and 10-bit Exp(-I) calculated in step 4 are fed to a 10-bit multiplier M3 to output a 20-bit result corresponding to Exp(-(($S_{in}-S_m$)$^2$/[($S_{in}-S_l$)*($S_h-S_{in}$)])), truncated to 12-bit accuracy 6) The 12-bit output corresponding to Exp(-(($S_{in}-S_m$)$^2$/[($S_{in}-S_l$)*($S_h-S_{in}$)])) is multiplied with the 12-bit saturation gain (sat_K) using the 12-bit multiplier M4 to output a 24-bit result corresponding to sat_K*[Exp(-(($S_{in}-S_m$)$^2$/[($S_{in}-S_l$)*($S_h-S_{in}$)]))], truncated to 12-bit accuracy 7) The 12-bit result of step-6 and offset value are fed to a 12-bit subtractor S6 to output a 12-bit result corresponding to [sat_K*Exp(-(($S_{in}-S_m$)$^2$/[($S_{in}-S_l$)*($S_h-S_{in}$)]))-offset]. The value of offset varies with the color of the incoming pixel and user defined gain (G)

8) In parallel to steps 1 to 7, an additional data path also exists to compute buff*G as explained in the following steps:

Based on the color of the incoming pixel, the Hue values H1 and H2 are obtained

The 12-bit subtractor S4 and 12-bit adder A1 computes (H1-20) and (H2+20) respectively for every pixel to output 12-bit results The 12-bit subtractor S5 conditionally computes either (H-(H1-20)) or ((H2+20)-H) depending upon the Hue value of the pixel lies in lower or upper buffer regions respectively and results a 12-bit output The 12-bit subtractor S5 output is fed to a 12-bit divider D2 to give a 24-bit result (12-bit quotient & 12-bit remainder) truncated to 6-bit accuracy corresponding to (H-(H1-20))/20 or ((H2+20)-H)/20

The 6-bit result from the divider D2 is fed to a 6-bit multiplier M5 along with the user defined gain (G) which results a 12-bit output corresponding to [(H-(H1-20))/20]*G or [((H2+20)-H)/20]*G 9) The 12-bit data from step 7 and step 8 are fed to a 12-bit multiplier M6 which results a 24-bit output corresponding to ΔS truncated to 12-bit accuracy 10) ΔS calculated in step 9, is fed to a 12-bit adder/subtractor SA1 along with input saturation ($S_{in}$) which results a 12-bit output saturation value ($S_{out}$). Here ΔS is added to the input saturation ($S_{in}$), if the user defined gain (G) is positive which leads to saturation enhancement else subtracted from the input saturation ($S_{in}$) which leads to saturation diminution.

In one or more embodiments, the saturation enhancement correction on a per-pixel basis for various user chosen colors is computed using equation:

$$S_{out}=S_{in}+\{G*[(\text{sat\_}K*(\text{Exp}(-(S_{in}-S_m)^2/((S_h-S_{in})*(S_{in}-S_l)))))-\text{Offset}]*\text{Buff}\}$$

where $S_{in}$ refers to saturation component of the input pixel, sat_K refers to determined saturation gain, G refers to a user gain, Buff refers to Hue buffer region correction=1 for H1≦H≦H2, (H1-H+20)/20 for H1-20<H<H1 and (H2+20-H)/20 for H2<H<H2+20, Offset refers to offset added for adjusting the saturation enhancement equation to provide desired correction in case of saturation diminution, $S_m$ refers to a saturation point, where peak gain is applied, $S_l$ refers to minimum saturation point considered for correction, $S_h$ refers to maximum saturation point considered for correction, Exp( ) refers to exponential function, and $S_{out}$ refers to enhanced saturation component output. For example, the possible number of non-linear saturation enhancement transfer characteristics curves is 4096 with 12-bit representation of saturation gain (sat_K).

Further, the saturation diminution correction on a per-pixel basis for various user chosen colors is computed using equation:

$$S_{out}=(1+G)*S_{in}$$

Figure 19:
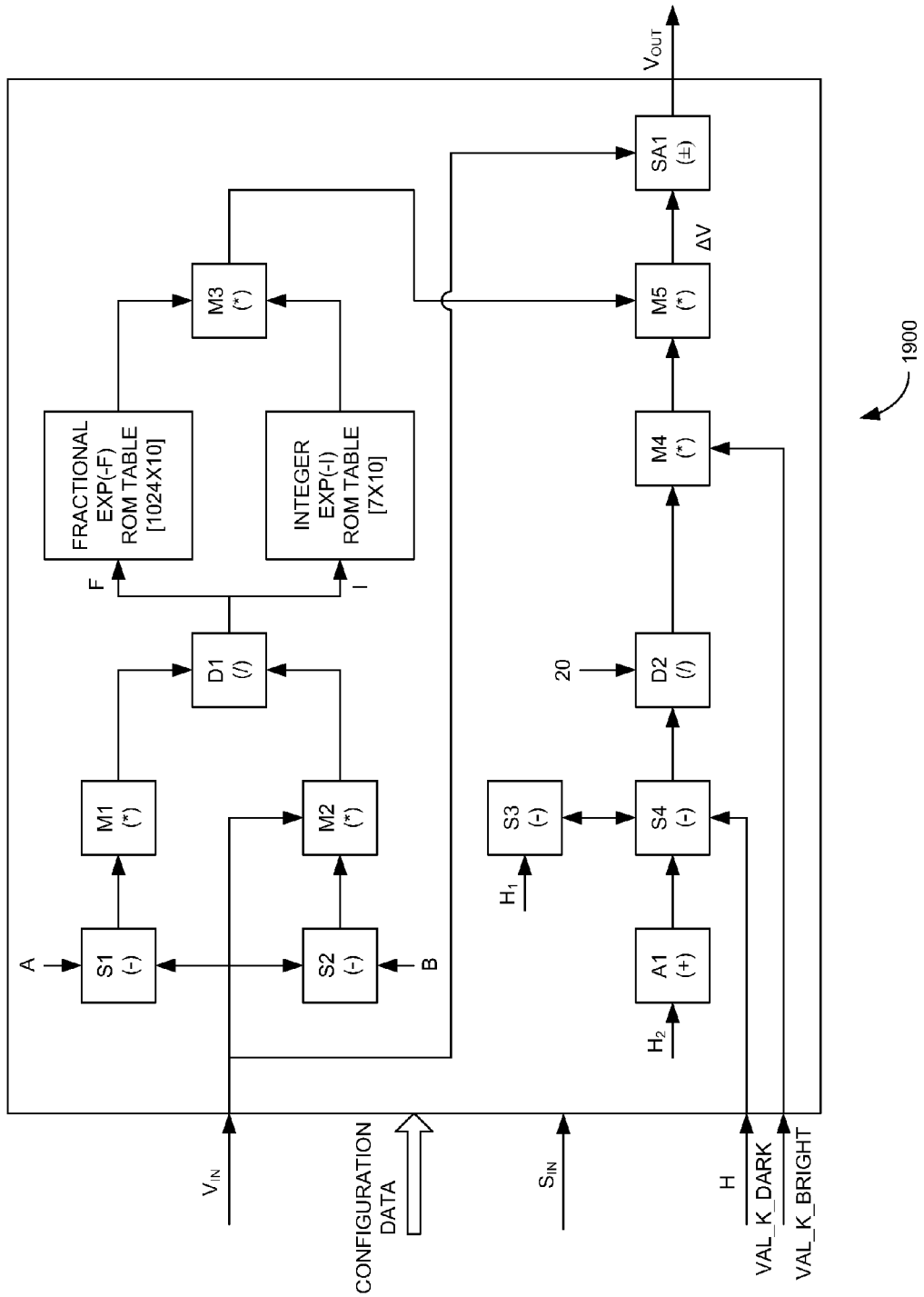
FIG. 19 is an example block diagram of the value correction module shown in FIG. 17, according to one embodiment.

FIG. 19 is an example block diagram 1900 of the value correction module 1780 shown in FIG. 17, according to one embodiment. Particularly, FIG. 19 illustrates multipliers M1-M5, dividers D1 and D2, subtractors S1-S4, an adder A1, an adder/subtractor SA1, a 1024×10 fractional exponent (-F) ROM table and a 7×10 integer exponent (-I) ROM table.

In parallel to the processes performed by the saturation correction module 1770, the value correction module 1780 applies a non-linear value transfer characteristics curve correction on a value component on a per-pixel basis in the substantially current or next video frame using the computed value dark-gain or value bright-gain of corresponding pixel as a function of the comparison (e.g., made by the value comparator 1760). In the following explanation, 12-bit representation of the predefined HSV components is considered. In some embodiments, the value correction module 1780 applies the non-linear value transfer characteristics curve correction using the following steps:

1) For every pixel, 12-bit subtractors S1 and S2 calculate the values of ($V_{in}-A$) and ($B-V_{in}$) respectively and gives 12-bit results. The values of A and B vary depending upon the color of the pixel. In case of dark correction, ($V_{in}-A$) and ($B-V_{in}$) represents ($V_{in}-V_m$) and ($V_{h\_dark}-V_{in}$) respectively and for bright correction ($V_{in}-A$) and ($B-V_{in}$) represents [-($V_{in}-V_{h\_bright}$)] and [-($V_{l\_bright}-V_{in}$)] respectively 2) The 12-bit multiplier M1 conditionally performs ($V_{in}-A$)$^2$ or ($V_{in}-A$)*1 for value dark-gain or value bright-gain correction of the pixel respectively to generate a 24-bit result, truncated to 10-bit accuracy 3) The 12-bit multiplier M2 conditionally performs [($B-V_{in}$)*($V_{in}$)] or [($B-V_{in}$)*1] for value dark-gain or value bright-gain correction of the pixel respectively to generate a 24-bit result, truncated to 10-bit accuracy 4) The 10-bit results obtained from step 2 and step 3 are fed to a 10-bit divider D1 which gives out a 20-bit result (10-bit integer and 10-bit fraction) corresponding to ($V_{in}-A$)$^2$/[($B-V_{in}$)*($V_{in}$)]) or ($V_{in}-A$)/($B-V_{in}$) for value dark-gain or value bright-gain correction of the pixel respectively 5) The 10-bit fractional value is fed to a [Exp(-F)] ROM table of size 1024×10 as address, which outputs a 10-bit result corresponding to Exp(fractional part(-($V_{in}-A$)$^2$/[($B-V_{in}$)*($V_{in}$)])) or Exp(fractional part(-($V_{in}-A$)/($B-V_{in}$))) for value dark-gain or value bright-gain correction of the pixel respectively. Since the ROM table size is 1024×10, the total size of the exponential ROM table is 1280 bytes. The 10-bit integer value is fed to a [Exp(−I)] ROM table of size 7×10 as address, which outputs a 10-bit result corresponding to Exp(integer part(−($V_{in}$−A)$^2$/[(B−$V_{in}$)*($V_{in}$)])) or Exp(integer part(−($V_{in}$−A)/(B−$V_{in}$))) value dark-gain or value bright-gain correction of the pixel respectively. Since the ROM table size is 7×10, the total size of the integer ROM table is 9 bytes.

6) The 10-bit Exp(−F) and 10-bit Exp(−I) calculated in step 5 are fed to a 10-bit multiplier M3 to output a 20-bit result corresponding to Exp(−(($V_{in}$−A)$^2$/[(B−$V_{in}$)*($V_{in}$)])) or Exp(−(($V_{in}$−A)/(B−$V_{in}$))), truncated to 12-bit accuracy for value dark-gain or value bright-gain correction of the pixel respectively 7) In parallel to steps 1 to 6, an additional data path also exists to compute buff*val_K_dark or buff*val_K_bright (value dark-gain or value bright-gain on a per-pixel basis) as explained in the following steps:

Based on the color of pixel, the Hue values H1 and H2 are obtained

The 12-bit subtractor S3 and 12-bit adder A1 computes (H1−20) and (H2+20) respectively for every pixel to output 12-bit results The 12-bit subtractor S4 conditionally performs either (H−(H1−20)) or ((H2+20)−H) depending upon the Hue value of the pixel lies in lower or upper buffer regions respectively and results a 12-bit output The 12-bit subtractor S4 output is fed to a 12-bit divider D2 to give out a 24-bit (12-bit quotient & 12-bit remainder) result, truncated to 12-bit accuracy corresponding to (H−(H1−20))/20 or ((H2+20)−H)/20

The 12-bit result from the divider D2 is fed to a 12-bit multiplier M4 along with val_K_dark or val_K_bright to produce a 24-bit output, truncated to 12-bit accuracy corresponding to [(H−(H1−20))/20]*val_K_dark or [((H2+20)−H)/20]*val_K_dark or [(H−(H1−20))/20]*val_K_bright or [((H2+20)−H)/20]*val_K_bright on the basis of Hue value of the pixel 8) The 12-bit outputs from step 6 and step 7 are fed to a 12-bit multiplier M5 to give a 24-bit output corresponding to ΔV, truncated to 12-bit accuracy 9) ΔV calculated in step 8 is fed to a 12-bit adder/subtractor SA1 which results a 12-bit output value ($V_{out}$). Here ΔV is added or subtracted to the input value component ($V_{in}$) of the pixel, when value dark-gain or value bright-gain correction is chosen by the value comparator 1760 respectively.

In one or more embodiments, the value component correction, based on value dark-gain or value bright-gain, on a per-pixel basis for various user chosen colors is computed using equation:

$$V_{out}=V_{in}+\{val\_K\_dark*Exp[-(V_{in}-V_m)^2/((V_{h\_dark}-V_{in})*(V_{in}-V_{l\_dark}))]*Buff\}$$

for $0 \leq V_{in} \leq (3*(\text{full scale value range}))/4$ $$V_{out}=V_{in}-\{val\_K\_bright*Exp[-(V_{h\_bright}-V_{in})/(V_{in}-V_{l\_bright})]*Buff\}$$

for $(3*(\text{full scale value range}))/4 < V_{in} \leq (\text{full scale value range})$ where $V_{in}$ refers to value component of the input pixel, val_K_dark refers to determined value dark-gain, $V_m$ refers to the value point, where peak gain is applied, $V_{l\_dark}$ refers to minimum value point considered for applying value dark-gain, which is 0, $V_{h\_dark}$ refers to maximum value point considered for applying value dark-gain, which is (3*(full scale value range))/4, Buff refers to Hue buffer region correction=1 for H1≤H≤H2, (H1−H+20)/20 for H1−20<H<H1, and (H2+20−H)/20 for H2<H<H2+20, Exp( ) refers to exponential function and $V_{out}$ refers to enhanced value component output, val_K_bright refers to determined value bright-gain, $V_{l\_bright}$ refers to minimum value point considered for applying value bright-gain, which is (3*(full scale value range))/4, $V_{h\_bright}$ refers to maximum value point considered for applying value bright-gain, which is (full scale value range). The possible number of value correction transfer characteristics curves is 4096 with 12-bit representation of saturation dependant value gain.

As explained above, in the saturation correction module 1770 and the value correction module 1780, there are two ROM tables of size 1024×10 and 7×10 per module which hold the fraction/integer values of exponent. Alternately, a single set of ROM tables can be shared between the saturation correction module 1770 and the value correction module 1780.

FIG. 20 is an example fractional exponent ROM table 2000, used in the saturation correction module 1770 and the value correction module 1780 shown in FIG. 18 and FIG. 19, respectively. The table 2000 illustrates example starting addresses, decimal equivalent of address, decimal equivalent of Exp(−address) and its equivalent binary representation which is a 10-bit output.

The above-described technique enhances or diminishes user chosen colors without introducing any artifacts and/or flicker. The above-described technique does not require large memory for storing look-up tables.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of dynamically and adaptively enhancing user chosen colors on a frame-by-frame basis of an incoming digital video signal, comprising:

forming a value-saturation 2D-histogram for each of the user chosen colors using a substantially current video frame, wherein the substantially current video frame includes a plurality of pixels;

dynamically computing a saturation dependent value component dark-gain, adaptive to slow or fast moving image sequences, for each of the user chosen colors using the corresponding value-saturation 2D-histogram of the substantially current video frame and a corresponding value-saturation 2D-histogram information and saturation dependent value component dark-gains of a substantially previous video frames;

determining which one of the dynamically computed saturation dependent value component dark-gains associated with the user chosen colors to be applied on a per-pixel basis by comparing Hue, saturation and value (HSV) components of each pixel with predefined HSV ranges of various user chosen colors, respectively; and applying the determined saturation dependent value component dark-gain to value component on the per-pixel basis in the substantially current or next video frame.

2. The method of claim 1, further comprising:
storing information associated with the value-saturation 2D-histogram of each of the user chosen colors; and
storing the saturation dependent value component dark-gain of each of the user chosen colors of the substantially current video frame.

3. The method of claim 1, wherein applying the determined saturation dependent value component dark-gain to the value component on the per-pixel basis, in the substantially current or next video frame comprises:
applying a non-linear value transfer characteristics curve corrections to the value component on the per-pixel basis based on the determined saturation dependent value component dark-gain of corresponding pixel, respectively, in the substantially current or next video frame.

4. A method of dynamically and adaptively enhancing user chosen colors on a frame-by-frame basis of an incoming digital video signal, comprising:
dynamically computing a saturation dependent value dark-gain for each of the user chosen colors of a substantially current video frame and wherein the substantially current video frame includes a plurality of pixels;
determining which one of the dynamically computed saturation dependent value dark-gains associated with the user chosen colors to be applied on a per-pixel basis by comparing Hue, saturation and value (HSV) components of each pixel with predefined HSV ranges of various user chosen colors, respectively; and
applying the determined saturation dependent value dark-gain on the per-pixel basis in the substantially current or next video frame, wherein applying the determined saturation dependent value dark-gain on the per-pixel basis, in the substantially current or next video frame comprises:
applying a non-linear value transfer characteristics curve corrections on the per-pixel basis based on the determined saturation dependent value dark-gain of corresponding pixel, respectively, in the substantially current or next video frame, and wherein, in applying the non-linear value transfer characteristics curve correction, the value component correction, based on the saturation dependent value dark-gain, on the per-pixel basis for various user chosen colors, is computed using equation:

$$V_{out}=V_{in}+\{val\_K\_dark*Exp[-(V_{in}-V_m)^2/((V_{h\_dark}-V_{in})*(V_{in}-V_{l\_dark}))]*Buff\},$$

for $0 \leq V_{in} \leq (3*(\text{full scale value range}))/4$,
wherein $V_{in}$ refers to value component of the input pixel, val_K_dark refers to determined saturation dependent value dark-gain, $V_m$ refers to the value point, where peak gain is applied, $V_{l\_dark}$ refers to minimum value point considered for applying saturation dependent value dark-gain, which is 0, $V_{h\_dark}$ refers to maximum value point considered for applying saturation dependent value dark-gain, which is (3*(full scale value range))/4, Buff refers to Hue buffer region correction=1 for H1≦H≦H2, (H1−H+20)/20 for H1−20<H<H1 and (H2+20−H)/20 for H2<H<H2+20, Exp( ) refers to exponential function, and $V_{out}$ refers to enhanced value component output.

5. The method of claim 1, further comprising:
determining whether there is another video frame in the incoming digital video signal;
if so, repeating the computing, determining and applying steps for a next video frame; and
if not, stopping the dynamically and adaptively enhancing the user chosen colors on a frame-by-frame basis of the incoming digital video signal.

6. An image processing apparatus for dynamically and adaptively enhancing user chosen colors on a frame-by-frame basis of an incoming digital video signal, comprising:
a value-saturation 2D-histogram calculator that forms a value-saturation 2D-histogram for each of the user chosen colors using a substantially current video frame, wherein the substantially current video frame includes a plurality of pixels;
a value gain calculator that dynamically computes a saturation dependent value component dark-gain, adaptive to slow or fast moving image sequences, for each of the user chosen colors using the corresponding value-saturation 2D-histogram of the substantially current video frame and corresponding value-saturation 2D-histogram information and saturation dependent value component dark-gains of a substantially previous video frame;
a value comparator that determines which one of the dynamically computed saturation dependent value component dark-gains associated with the user chosen colors or no gain is to be applied on a per-pixel basis by comparing Hue, saturation and value (HSV) components of each pixel with predefined HSV component ranges of various user chosen colors, respectively; and
a value correction module that applies the determined saturation dependent value component dark-gain to value component on the per-pixel basis in the substantially current or next video frame.

7. The image processing apparatus of claim 6, further comprising memory for storing information associated with the value-saturation 2D-histogram and for storing the saturation dependent value component dark-gain of each of the user chosen colors of the substantially current video frame.

8. The image processing apparatus of claim 7, wherein the value correction module applies a non-linear value transfer characteristics curve corrections on the per-pixel basis based on the determined saturation dependent value component dark-gain of corresponding pixel, in the substantially current or next video frame.

9. An image processing apparatus for dynamically and adaptively enhancing user chosen colors on a frame-by-frame basis of an incoming digital video signal, comprising:
a value gain calculator that dynamically computes a saturation dependent value dark-gain, adaptive to slow or fast moving image sequences, for each of the user chosen colors of a substantially current video frame and wherein the substantially current video frame includes a plurality of pixels;
a value comparator that determines which one of the dynamically computed saturation dependent value dark-gains associated with the user chosen colors or no gain is to be applied on a per-pixel basis by comparing Hue, saturation and value (HSV) components of each pixel with predefined HSV component ranges of various user chosen colors, respectively; and
a value correction module that applies the determined saturation dependent value dark-gain to value component on the per-pixel basis in the substantially current or next video frame, wherein the value correction module applies a non-linear value transfer characteristics curve corrections on the per-pixel basis based on the determined value component dark-gain of corresponding pixel, in the substantially current or next video frame, and wherein the value component correction based on the saturation dependent value dark-gain, on the per-pixel basis for various user chosen colors is computed using the equation:

$$V_{out}=V_{in}+\{val\_K\_dark*Exp[-(V_{in}-V_m)^2/((V_{h\_dark}-V_{in})*(V_{in}-V_{l\_dark}))]*Buff\},$$

for $0 \leq V_{in} \leq (3*(\text{full scale value range}))/4$, wherein $V_{in}$ refers to value component of the input pixel, val_K_dark refers to determined saturation dependent value dark-gain, $V_m$ refers to the value point, where peak gain is applied, $V_{l\_dark}$ refers to minimum value point considered for applying saturation dependent value dark-gain, which is 0, $V_{h\_dark}$ refers to maximum value point considered for applying saturation dependent value dark-gain, which is $(3*(\text{full scale value range}))/4$, Buff refers to Hue buffer region correction=1 for H1≤H≤H2, (H1−H+20)/20 for H1−20<H<H1 and (H2+20−H)/20 for H2<H<H2+20, Exp( ) refers to exponential function, and $V_{out}$ refers to enhanced value component output.

10. The method of claim 1, wherein, in forming the value-saturation 2D-histogram for each of the user chosen colors using the substantially current video frame, the value component is represented along X-axis, saturation component is represented along Y-axis and pixel count is represented along Z-axis.

* * * * *